(12) United States Patent  
Aida et al.

(10) Patent No.: US 8,159,815 B2  
(45) Date of Patent: Apr. 17, 2012

(54) ELECTROCHEMICAL CAPACITOR

(75) Inventors: Taira Aida, Shiga (JP); Keisuke Yagi, Shiga (JP); Koji Yamada, Shiga (JP); Ichiro Murayama, Shiga (JP)

(73) Assignee: Daihatsu Motor Co., Ltd., Osaka (JP)

( * ) Notice: Subject to any disclaimer, the term of this patent is extended or adjusted under 35 U.S.C. 154(b) by 407 days.

(21) Appl. No.: 12/311,002

(22) PCT Filed: Sep. 14, 2007

(86) PCT No.: PCT/JP2007/067978  
§ 371 (c)(1),  
(2), (4) Date: Mar. 16, 2009

(87) PCT Pub. No.: WO2008/035638  
PCT Pub. Date: Mar. 27, 2008

(65) Prior Publication Data  
US 2009/0310282 A1 Dec. 17, 2009

(30) Foreign Application Priority Data

Sep. 19, 2006 (JP) .................................. 2006-252874  
Sep. 19, 2006 (JP) .................................. 2006-252875

(51) Int. Cl.  
*H01G 9/02* (2006.01)

(52) U.S. Cl. ........ 361/505; 361/502; 361/504; 361/512; 361/525; 429/188; 429/307; 429/231.95; 427/123; 204/450

(58) Field of Classification Search .................. 361/500, 361/502–505, 512, 525, 532  
See application file for complete search history.

(56) References Cited

U.S. PATENT DOCUMENTS

| | | | |
|---|---|---|---|
| 5,953,204 A | 9/1999 | Suhara et al. | |
| 6,489,055 B1 | 12/2002 | Ichihashi et al. | |
| 7,548,409 B2 * | 6/2009 | Kojima et al. | 361/503 |
| 7,817,403 B2 * | 10/2010 | Tasaki et al. | 361/512 |
| 2002/0039275 A1 | 4/2002 | Takeuchi et al. | |
| 2002/0160261 A1 | 10/2002 | Schmidt et al. | |
| 2004/0085710 A1 | 5/2004 | Takeuchi et al. | |
| 2004/0131860 A1 | 7/2004 | Tano et al. | |
| 2004/0179328 A1 | 9/2004 | Ando et al. | |
| 2005/0142447 A1 * | 6/2005 | Nakai et al. | 429/231.95 |
| 2005/0272214 A1 * | 12/2005 | Chiang et al. | 438/309 |
| 2006/0115723 A1 * | 6/2006 | Ando et al. | 429/162 |
| 2007/0002524 A1 * | 1/2007 | Ando et al. | 361/503 |
| 2007/0223178 A1 | 9/2007 | Fujino | |
| 2010/0027195 A1 * | 2/2010 | Taguchi et al. | 361/527 |

FOREIGN PATENT DOCUMENTS

| | | |
|---|---|---|
| CA | 2356578 | 3/2002 |
| JP | 60-182670 | 9/1985 |
| JP | 63-076274 | 4/1988 |
| JP | 07-220758 | 8/1995 |
| JP | 8-107048 | 4/1996 |
| JP | 08-321326 | 12/1996 |
| JP | 9-283383 | 10/1997 |

(Continued)

*Primary Examiner* — Courtney Smith  
(74) *Attorney, Agent, or Firm* — Jean C. Edwards, Esq.; Edwards Neils PLLC

(57) ABSTRACT

Disclosed is an electrochemical capacitor comprising a positive electrode exhibiting an irreversible capacity for extending the potential range during a charge/discharge cycle, a negative electrode composed of a material which is capable of reversibly adsorbing/desorbing lithium ions, and an electrolyte solution composed of an organic solvent containing lithium ions.

2 Claims, 12 Drawing Sheets

FOREIGN PATENT DOCUMENTS

| | | |
|---|---|---|
| JP | 2000-124084 | 4/2000 |
| JP | 2001-068154 | 3/2001 |
| JP | 2002-25867 | 1/2002 |
| JP | 2002-158036 | 5/2002 |
| JP | 2002-305024 | 10/2002 |
| JP | 2002-535807 | 10/2002 |
| JP | 2002-367584 | 12/2002 |
| JP | 2003-51430 | 2/2003 |
| JP | 2000-150319 | 5/2003 |
| JP | 2003-346801 | 12/2003 |
| JP | 2004-342504 | 12/2004 |
| JP | 2005-101409 | 4/2005 |
| JP | 3689948 | 6/2005 |
| JP | 2005-243933 | 9/2005 |
| JP | 2007-250415 | 9/2007 |
| JP | 2007-266064 | 10/2007 |
| JP | 2007-281107 | 10/2007 |
| WO | WO 00/42672 | 7/2000 |
| WO | WO 03/003395 | 1/2003 |

\* cited by examiner

ELECTROCHEMICAL CAPACITOR

CROSS-REFERENCE TO RELATED APPLICATIONS

The present invention is a 35 U.S.C. 371 national stage entry of PCT/JP2007/067978, filed Sept. 14, 2007, which claims priority from Japanese Patent Application Nos. 2006-252878, filed Sept. 19, 2006 and 2006-252875, filed Sept. 19, 2006, the contents of which are herein incorporated by reference in their entirety.

TECHNICAL FIELD

The present invention relates to an electrochemical capacitor. More specifically, the present invention relates to a hybrid capacitor capable of storing electricity both with an electric double layer and by an oxidation-reduction reaction.

BACKGROUND ART

Conventionally, there have been considered and developed an electric double layer capacitors having high power and a long service life as a storage device to be mounted in a hybrid vehicle or a fuel cell vehicle.

The electric double layer capacitor stores energy by adsorbing anions and cations onto a positive electrode and a negative electrode, respectively. The stored energy is represented by $CV^2/2$, and a greater energy can be stored by increasing voltage. However, excessively high voltage can cause a chemical reaction (oxidation-reduction reaction) in the positive and negative electrodes, which in turn deteriorates these electrodes.

Therefore, an upper limit of the voltage needs to be set within a range which does not cause any chemical reaction in the positive and negative electrodes, so that the potential range becomes narrow, thereby making it difficult to improve energy density.

In recent years, in order to improve the energy density of the electric double layer capacitor, there has been proposed a hybrid capacitor capable of storing electricity with an electric double layer and also storing electricity by an oxidation-reduction reaction by using a material capable of reversibly carrying lithium ions.

However, even the hybrid capacitor may fail to sufficiently exhibit the capacitance of the positive electrode because an irreversible capacity generates in the negative electrode during a charging/discharging cycle, thereby narrowing the potential range of the positive electrode. That is, the capacitance of the positive electrode cannot be fully utilized, failing to achieve improvement in energy density.

In order to eliminate the above-mentioned disadvantage, for example, Patent Document 1 discloses an electric double layer capacitor having a positive electrode composed of a polarizable electrode material mostly containing activated carbons and a current collector made of aluminium or stainless steel; a negative electrode composed of a carbonaceous material in which lithium ions are inserted into a carbon material capable of carrying lithium ions by a chemical method or an electrochemical method and a current collector which does not form an alloy with lithium; and a non-aqueous electrolyte solution containing a lithium salt.

Further, Patent Document 2 discloses an organic electrolyte capacitor including a positive electrode, a negative electrode, and an aprotic organic solvent solution of lithium salt as an electrolyte solution, in which the positive electrode active material can reversibly carry lithium ions and anions, the negative electrode active material can reversibly carry lithium ions, capacity per unit weight of the negative electrode active material is higher by a factor of 3 or more than that of the positive electrode active material, the weight of the positive electrode active material is higher than that of the negative electrode active material, and lithium ions are preliminarily carried on the negative electrode.

The electrochemical capacitors described in Patent Document 1 and Patent Document 2 can compensate for the capacitance equivalent to the irreversible capacity, for example, by precharging the negative electrode to thereby insert lithium ions into the negative electrode in advance. Therefore, the capacitance of the positive electrode can be fully utilized, thereby achieving improvement in capacitor energy density.

When the lithium ions thus are inserted with a large amount of electricity, the capacitance can be further exhibited in the positive electrode by adsorption and desorption of the lithium ions, so that the discharge potential of the positive electrode is shifted to the lower potential region, thereby extending the potential range. Therefore, energy density can be further improved.

Patent Document 1: Japanese Patent No. 3689948
Patent Document 2: International Patent Publication No. WO2003/003395

DISCLOSURE OF THE INVENTION

Problems to be Solved

However, in order to precharge the negative electrode to insert lithium ions, an another electrode (third electrode) such as a lithium electrode for supplying lithium ions needs to be provided in the capacitor, so that some other disadvantages arise such as complication of capacitor structure, upsizing of the capacitor, and a cost increase accompanied thereby.

The present invention has been achieved under such circumstances, and an object of the present invention is to provide an electrochemical capacitor capable of improving energy density with a simple structure.

Means for Solving the Problem

To achieve the above object, the electrochemical capacitor of the present invention includes a positive electrode which exhibits an irreversible capacity for extending a potential range in a charging/discharging cycle; a negative electrode composed of a material capable of reversibly carrying lithium ions; and an electrolyte solution composed of an organic solvent containing lithium ions.

It is preferable that the electrochemical capacitor of the present invention comprises a scavenger which scavenges a negative electrode activity inhibitor derived from anions contained in the electrolyte solution due to generation of the irreversible capacity in the positive electrode.

In the electrochemical capacitor of the present invention, it is preferable that the scavenger is contained at a ratio of $2 \times 10^{-5}$ mol to $175 \times 10^{-5}$ mol per 1 mAh of the irreversible capacity.

Further, in the electrochemical capacitor of the present invention, it is preferable that a potential of the positive electrode is not less than 4.23 V vs. Li/Li$^+$.

EFFECT OF THE INVENTION

The electrochemical capacitor of the present invention can fully utilize the capacitance of the positive electrode by exhibiting an irreversible capacity for extending the potential range in the positive electrode during a charging/discharging cycle, so that the energy density of the capacitor can be improved. Further, the electrochemical capacitor can be made in a simple structure because it does not require any lithium electrode for precharging the negative electrode. In addition, such simple structured capacitor can reduce cost.

EMBODIMENT OF THE INVENTION

Figure 1:
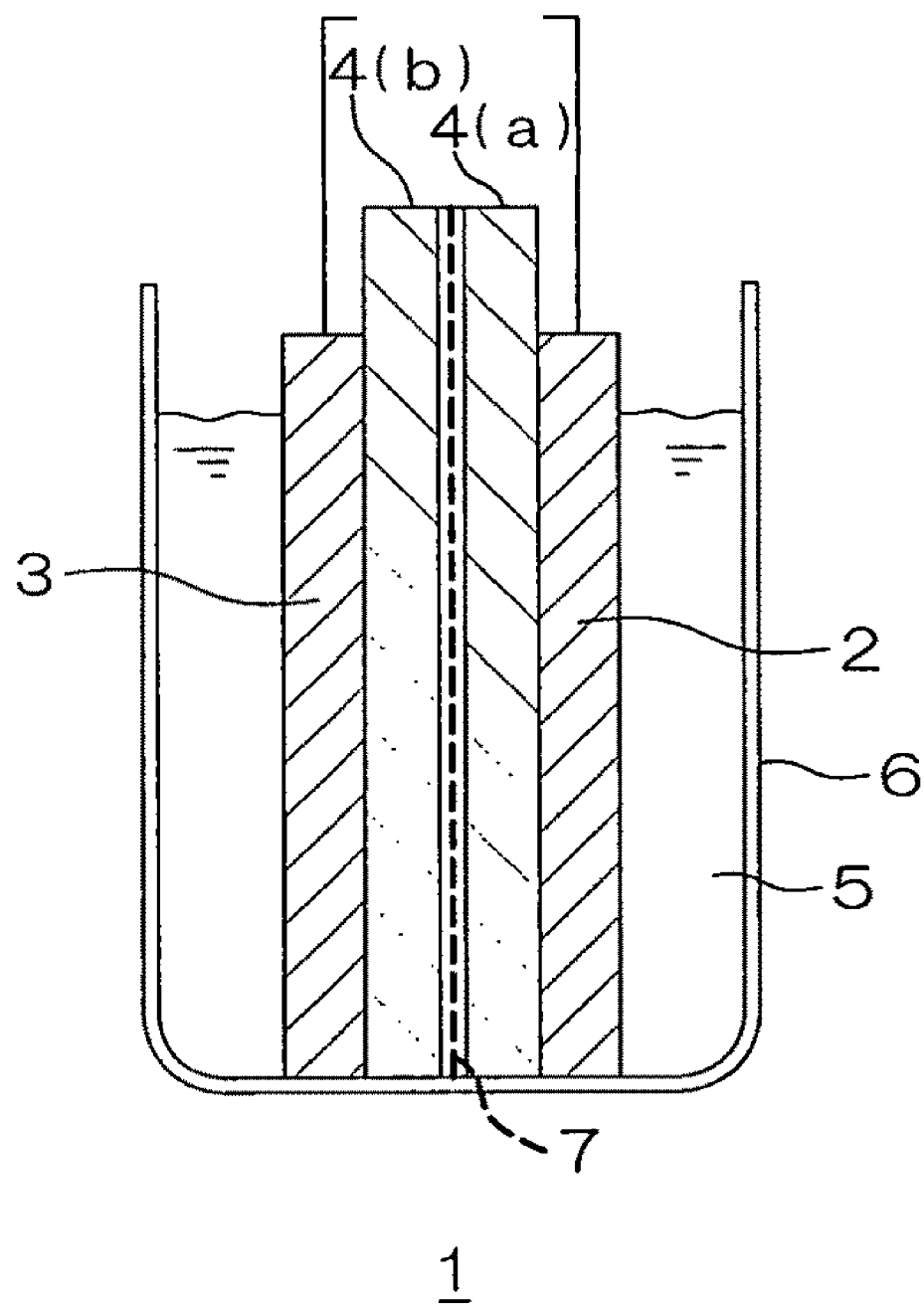
FIG. 1 is a schematic configuration diagram of a hybrid capacitor as an embodiment of an electrochemical capacitor according to the present invention.

FIG. 1 is a schematic configuration diagram of a hybrid capacitor as an embodiment of an electrochemical capacitor according to the present invention.

In FIG. 1, this hybrid capacitor 1 includes a positive electrode 2, a negative electrode 3 opposed at a spaced interval to the positive electrode 2, a separator 4 interposed between the positive electrode 2 and the negative electrode 3, and a cell bath 6 accommodating the positive electrode 2, the negative electrode 3, and the separator 4, and filled with an electrolyte solution 5 so as to immerse these components thereinto. The hybrid capacitor 1 is a battery cell adopted on a laboratory scale, and is industrially adopted by properly scaling up by a known technique.

The positive electrode 2 is formed, for example, by molding a mixture including an activated carbon, a conductive agent, and a binder into an electrode shape, and then drying the molded mixture.

The activated carbon is obtained, for example, by subjecting activated carbon material to activation treatment.

Examples of the activated carbon material include, but not particularly limited to, pitch-based materials such as petroleum pitch, coal pitch, and mesophase pitch; coke-based materials obtained by heat-treating these pitch-based materials; plant-based materials such as coconut shells and wood flour; and synthetic resin-based materials such as phenol resins, vinyl chloride resins, resorcinol resins, polyacrylonitrile, polybutyral, polyacetal, polyethylene, polycarbonate, and polyvinyl acetate, and carbides thereof. Among them, pitch-based materials, coke-based materials, and synthetic resin-based materials (in particular, vinyl chloride resins and polyacrylonitrile) which are graphitizable carbons (soft carbons) are preferable.

Examples of the activation treatment include alkali activation treatment using potassium hydroxide (KOH), sodium hydroxide (NaOH), lithium hydroxide (LiOH), cesium hydroxide (CsOH), or rubidium hydroxide (RbOH) as an activator; chemical activation treatment using zinc chloride ($ZnCl_2$) or phosphoric acid ($H_3PO_4$) as an activator; gas activation treatment using carbon dioxide ($CO_2$) or air as an activator; and water vapor activation treatment using water vapor ($H_2O$) as an activator. Among them, alkali activation treatment is preferable, and alkali activation treatment using potassium hydroxide (KOH) as an activator is more preferable. Of these activation treatments, for example, the above-mentioned KOH activation treatment is performed by calcining a soft carbon under a nitrogen atmosphere, for example, at 500 to 800° C. and thereafter calcining the soft carbon with, for example, 0.5 to 5 parts by weight of KOH per 1 part by weight of the soft carbon under a nitrogen atmosphere at 700 to 1000° C.

When the activated carbon material is subjected to such activation treatment, a relatively large irreversible capacity can be exhibited in the positive electrode 2 particularly in the charging/discharging cycle in which the potential of the positive electrode 2 is not less than 4 V vs. Li/Li$^+$, so that the capacitance of the positive electrode 2 can be fully utilized.

The amount of the activated carbon thus obtained is, for example, 80 to 99% by weight of the mixture.

Examples of the conductive agent include carbon black, Ketjen black, and acetylene black. The amount of the conductive agent blended is, for example, 0 to 20% by weight of the mixture. That is, the conductive agent may or may not be mixed.

Examples of the binder include polytetrafluoroethylene (PTFE), polyvinylidene fluoride (PVdF), fluoro-olefin copolymer crosslinked polymer, fluoro-olefin vinyl ether copolymer crosslinked polymer, carboxymethyl cellulose, polyvinyl pyrrolidone, polyvinyl alcohol, and polyacrylic acid. The amount of the binder blended is, for example, 1 to 10% by weight of the mixture.

For molding the positive electrode 2 into an electrode shape, for example, the above-mentioned mixture including the activated carbon, the conductive agent, and the binder is rolled under pressure using a roll press machine to thereby produce an electrode sheet. The electrode sheet is then punched out into an electrode shape, and the punched piece is dried and then applied by pressure to a stainless steel mesh to be used as a positive electrode.

Examples of the metal foil include aluminum foil, copper foil, stainless steel foil, and nickel foil.

The negative electrode 3 is an electrode reversibly carrying lithium ions, and is formed of electrode materials capable of reversibly carrying lithium ions. These electrode materials are not particularly limited and, for example, non-graphitizable carbon material (hard carbon), graphitizable carbon material (soft carbon), or graphite may be used. The negative electrode 3 is formed by molding a mixture including hard carbon, soft carbon, or graphite; a conductive agent; and a binder into an electrode shape, and then drying.

The hard carbon can be obtained by calcining a common thermosetting resin such as phenol resin, melamine resin, urea resin, furan resin, epoxy resin, alkyd resin, unsaturated polyester resin, diallyl phthalate resin, furfural resin, silicone resin, xylene resin, and urethane resin.

Examples of the soft carbon include the above-mentioned soft carbons such as pitch-based materials, coke-based materials, and synthetic resin-based materials.

Examples of the graphite include graphite-based carbon materials such as natural graphites, artificial graphites, graphitized mesophase carbon micro-beads, graphitized mesophase carbon fibers, graphite whiskers, graphitizable carbon fibers, and pyrolysis products of condensed polycyclic hydrocarbon compounds including pitch and coke. As the graphite-based carbon material, powders having an average particle size of 25 μm or less are preferably used.

The amount of the hard carbon, the soft carbon, or the graphite blended is, for example, 80 to 99% by weight of the mixture.

Examples of the conductive agent include the above-mentioned conductive agents. The amount of the conductive agent blended is, for example, 0 to 20% by weight of the mixture. That is, the conductive agent may or may not be mixed.

Examples of the binder include the above-mentioned binders. The amount of the binder is, for example, 1 to 10% by weight of the mixture.

For molding the negative electrode 3 into an electrode shape, for example, the mixture including the hard carbon, the soft carbon or the graphite; the conductive agent; and the binder is stirred and mixed in a solvent, and the mixed solvent is applied on to a metal foil used as a current collector, dried, and punched out into an electrode shape. The punched piece is then dried.

Examples of the solvent include N-methylpyrrolidone, dimethylformamide, toluene, xylene, isophorone, methyl ethyl ketone, ethyl acetate, methyl acetate, ethyl acetate, dimethyl phthalate, ethanol, methanol, butanol, and water.

Examples of the metal foil include the above-mentioned metal foils.

The separator 4 is made of an insulating material including, for example, inorganic fibers such as glass fibers, fibers of silica or alumina, ceramic fibers, and whiskers; natural fibers such as cellulose; and organic fibers such as polyolefin and polyester. The separator 4 is formed, for example, in a plate form.

The electrolyte solution 5 consists of an organic solvent containing lithium ions, and is prepared by dissolving a lithium salt in the organic solvent.

Examples of the lithium salt include $LiClO_4$, $LiCF_3SO_3$, $LiC(SO_2CF_3)_3$, $LiB(C_6H_5)_4$, $LiC_4F_9SO_3$, $LiC_8F_{17}SO_3$, $LiB[C_6H_3(CF_3)_2-3,5]_4$, $LiB(C_6F_5)_4$, $LiB[C_6H_4(CF_3)-4]_4$, $LiBF_4$, $LiPF_6$, $LiAsF_6$, $LiSbF_6$, $LiCF_3CO_2$, and $LiN(CF_3SO_2)_2$. In the above formulae, $[C_6H_3(CF_3)_2-3,5]$ is a phenyl group substituted at the 3- and 5-positions with —$CF_3$, and $[C_6H_4(CF_3)-4]$ is a phenyl group substituted at the 4-position with —$CF_3$, respectively.

Examples of the organic solvent include propylene carbonate, propylene carbonate derivatives, ethylene carbonate, ethylene carbonate derivatives, butylene carbonate, dimethyl carbonate, diethyl carbonate, ethyl methyl carbonate, γ-butyrolactone, 1,3-dioxolane, dimethyl sulfoxide, sulfolane, formamide, dimethylformamide, dimethylacetamide, dioxolane, triester phosphate, maleic anhydride, succinic anhydride, phthalic anhydride, 1,3-propanesultone, 4,5-dihydropyrane derivatives, nitrobenzene, 1,3-dioxane, 1,4-dioxane, 3-methyl-2-oxazolidinone, 1,2-dimethoxyethane, tetrahydrofuran, 2-methyl tetrahydrofuran, tetrahydrofuran derivatives, sydnone compounds, acetonitrile, nitromethane, alkoxy ethane, and toluene. These can be used alone or in combination of two or more kinds.

The electrolyte solution 5 is prepared so that the concentration of the lithium salt in the organic solvent is, for example, 0.5 to 5 mol/L, or preferably 1 to 3 mol/L. Moreover, to attain a higher withstand voltage, the water content in the electrolyte solution 5 is prepared so as to be, for example, 50 ppm or less, or preferably 10 ppm or less.

In the hybrid capacitor 1, as the method for exhibiting the irreversible capacity for extending the potential range in the positive electrode 2, there is a method, for example, for adding an additive electrochemically susceptible to oxidative decomposition to the electrolyte solution 5, in addition to the method for setting the potential of the positive electrode 2 not less than 4V vs. $Li/Li^+$ in the charging/discharging cycle as described above.

Examples of the additive include dimethylformamide (DMF), dimethyl sulfoxide (DMSO), $LiCF_3SO_4$, and LiFSI. Due to the addition of these additives to the electrolyte solution 5, an irreversible capacity can be exhibited in the positive electrode 2 during the charging/discharging cycle, so that the capacitance of the positive electrode 2 can be fully utilized.

In the hybrid capacitor 1, the positive electrode 2 can exhibit an irreversible capacity for extending the potential range during the charging/discharging cycle.

The method for exhibiting the irreversible capacity in the positive electrode 2 is not particularly limited and, for example, at a first cycle of the charging/discharging cycle of the hybrid capacitor 1 (one cycle as used herein refers to a charge-discharge cycle including one charge and one discharge step), constant current charge is performed at a constant current of a first current value until a cell voltage applied to the positive electrode 2 and the negative electrode 3 reaches a predetermined voltage, and the cell voltage is then kept at a constant voltage of the predetermined voltage mentioned above until the current reaches a second current value.

The above-mentioned predetermined voltage has a magnitude of, for example, 2.5 to 5 V, or preferably 4 to 5 V (in this case, the potential of the positive electrode 2 is 4 to 5 V vs. $Li/Li^+$, or preferably 4.5 to 4.8 V vs. $Li/Li^+$).

The first current value is, for example, 0.1 to 10 $MA/cm^2$, or preferably 1 to 5 $mA/cm^2$.

The second current value is, for example, 0.05 to 1 $mA/cm^2$, or preferably 0.2 to 0.5 $mA/cm^2$.

Subsequently, constant current discharge is performed at a constant current of 0.1 to 10 $mA/cm^2$, or preferably 1 to 5 $mA/cm^2$ until the cell voltage reaches 0 to 4 V, or preferably 1 to 3 V (in this case, the potential of the positive electrode 2 is 1.5 to 4 V vs. Li/Li$^+$, or preferably 2 to 3 V vs. Li/Li$^+$). In the second and subsequent cycles, for example, charging/discharging is performed so that the cell voltage is 0 to 5 V, or preferably 1 to 5 V (in this case, the potential of the positive electrode 2 is 1.5 to 5 V vs. Li/Li$^+$, or preferably 2 to 4.6 V vs. Li/Li$^+$).

Therefore, the charge at the first charging/discharging cycle allows an irreversible capacity to be exhibited in the positive electrode 2, so that the capacitance of the positive electrode 2 can be fully utilized at the discharge of the first cycle and at the charging/discharging of the second and subsequent cycles.

Figure 2:
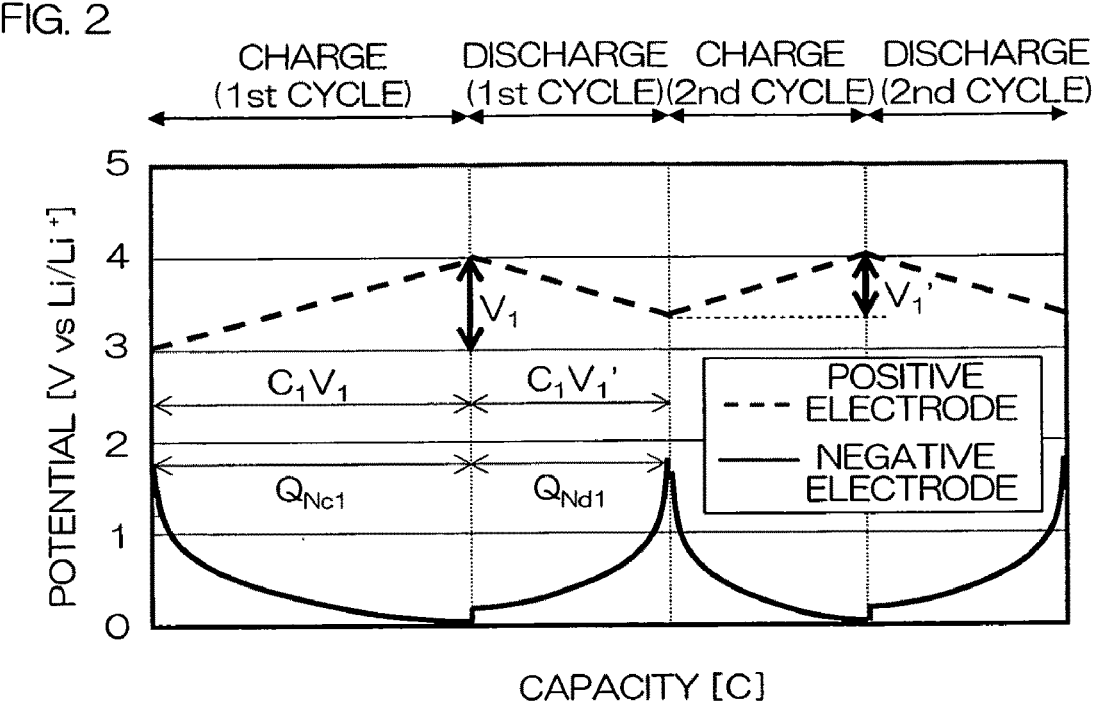
FIG. 2 is a general profile showing charge/discharge of a conventional hybrid capacitor.

Specifically, with the conventional hybrid capacitor, as FIG. 2 shows a general profile showing charge/discharge thereof, the irreversible capacity (e.g., $Q_{Nc1}-Q_{Nd1}$) generated in the negative electrode 3 causes the potential range of the positive electrode 2 to be reduced from $V_1$ to $V_1'$. As a result, the capacitance of the positive electrode 2 decreases from $C_1V_1$ ($C_1$: electrostatic capacity of an electric double layer in the positive electrode 2) to $C_1V_1'$. Thus, although the positive electrode 2 originally has a capacitance of $C_1V_1$, it cannot fully utilize such capacitance and can only exhibit a capacitance of $C_1V_1'$. As a result, the conventional hybrid capacitor can only obtain a relatively low energy density. Therefore, such hybrid capacitor requires a greater amount of positive electrode 2 (activated carbon) in order to attain a sufficient capacitance in the positive electrode 2 like the negative electrode 3, so that the improvement in energy density can be seriously hindered.

Figure 3:
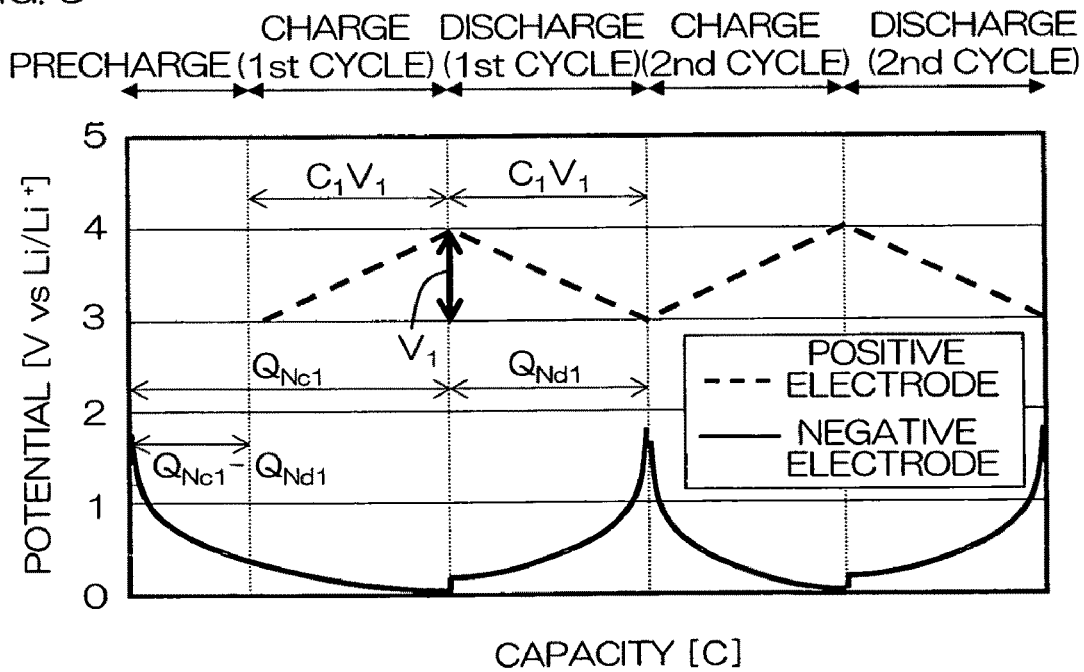
FIG. 3 is a profile showing charge/discharge of a hybrid capacitor with its negative electrode precharged.

As FIG. 3 shows a profile showing charge/discharge thereof, when the negative electrode 3 is precharged with a capacitance equivalent to the irreversible capacity (e.g., $Q_{Nc1}-Q_{Nd1}$) of the negative electrode 3, the original capacitance $C_1V_1$ of positive electrode 2 can be obtained without increasing the amount of the positive electrode 2 used. In this case, however, a third electrode (e.g., lithium electrode) for precharging the negative electrode 3 needs to be provided in the hybrid capacitor 1, so that some other disadvantages arise such as complication of capacitor structure, upsizing of the capacitor, and a cost increase accompanied thereby.

Figure 4:
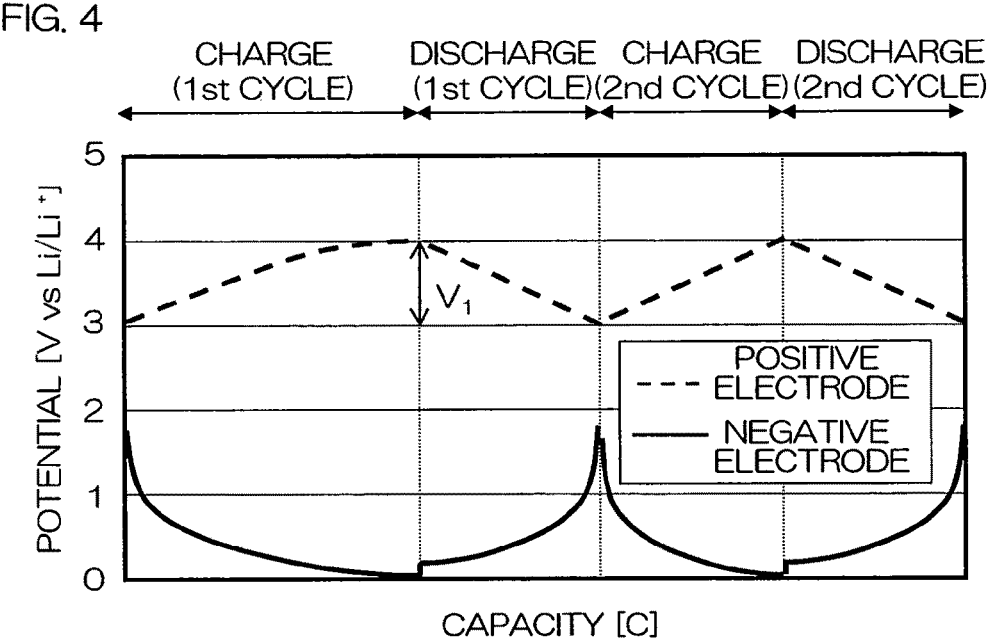
FIG. 4 is a profile showing charge/discharge of a hybrid capacitor of this embodiment.

On the other hand, without increasing the amount of the positive electrode 2 used, and further without providing the above-mentioned third electrode, the hybrid capacitor 1 of this embodiment can obtain the original capacitance $C_1V_1$ of the positive electrode 2 as FIG. 4 shows a profile showing charge/discharge thereof. Specifically, the irreversible capacity of the negative electrode 3 can be compensated for by exhibiting an irreversible capacity equivalent to the irreversible capacity of the negative electrode 3 in the positive electrode 2 at the first charging/discharging cycle, and the capacitance of the positive electrode 2 can be fully utilized, so that the energy density of the hybrid capacitor 1 can be improved.

Figure 5:
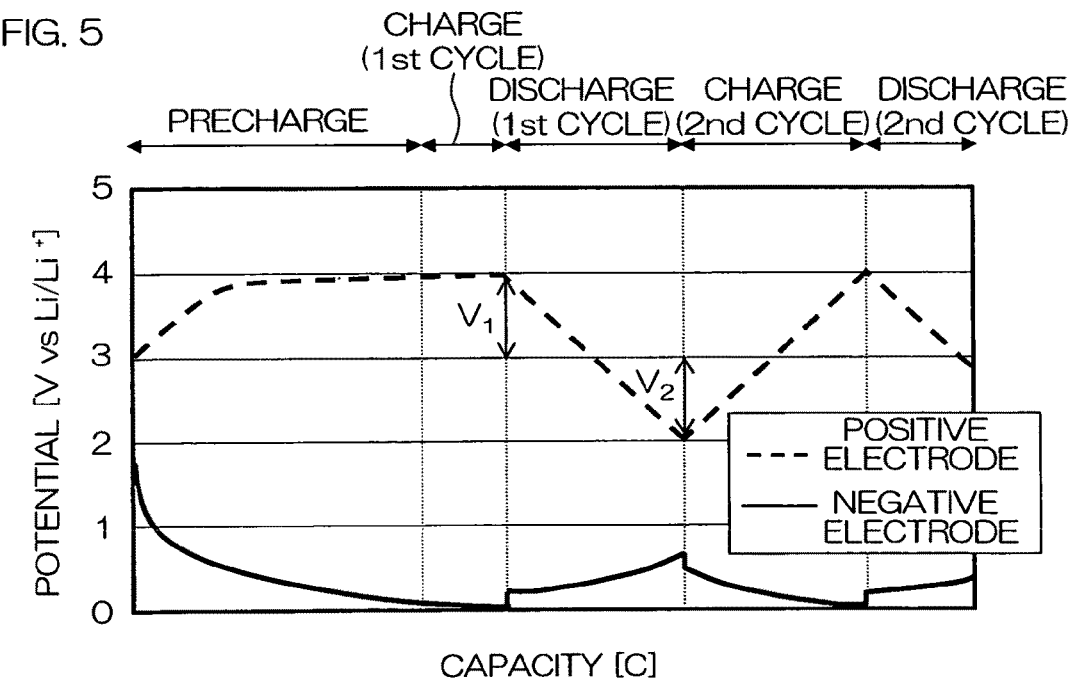
FIG. 5 is a profile showing charge/discharge of a hybrid capacitor of this embodiment, showing the case where the discharge potential of its positive electrode is shifted to the lower potential region.

As FIG. 5 shows a profile showing charge/discharge thereof, when the positive electrode 2 exhibits an irreversible capacity exceeding the irreversible capacity of the negative electrode 3, the positive electrode 2 exhibits a capacitance $C_1V_2$ obtained by adsorption and desorption of lithium ions, as well as the capacitance $C_1V_1$ obtained by adsorption and release of anions, during the charging/discharging cycle, and the discharge potential of the positive electrode 2 is shifted to the lower potential region, so that the potential range of the positive electrode 2 can be extended to $V_1+V_2$. Therefore, the energy density can be further improved.

On the other hand, due to the generation of the irreversible capacity in the positive electrode 2, the hybrid capacitor 1 may form a negative electrode activity inhibitor derived from anions (e.g., $PF_6^-$ contained in $LiPF_6$) contained in the electrolyte solution 5.

As the process of forming a negative electrode activity inhibitor, for example, a process of forming HF resulting from the generation of the irreversible capacity in the positive electrode 2 will be described below.

First, when the above-mentioned predetermined voltage is applied to the positive electrode 2 and the negative electrode 3, a proton (H$^+$) is formed in the electrolyte solution 5, for example, from water or an organic substance contained in the positive electrode 2 or the electrolyte solution 5, as shown in the following formulae (1) and (2):

$$2H_2O \to O_2 + 4H^+ + 4e^- \quad (1)$$

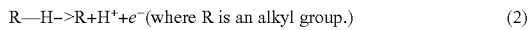

$$R\text{—}H \to R + H^+ + e^- \text{ (where R is an alkyl group.)} \quad (2)$$

The proton thus formed reacts with anions (e.g., $PF_6^-$ contained in $LiPF_6$) contained in the electrolyte solution 5 to form HF (cf. the following formula (3)).

$$PF_6^- + H^+ \to PF_5 + HF \quad (3)$$

Negative electrode activity inhibitors like HF may decrease the capacitance of the negative electrode 3, thereby lowering the energy density of the hybrid capacitor 1. Therefore, the hybrid capacitor 1 preferably contains a scavenger or scavenger material for scavenging such negative electrode activity inhibitors.

For example, it is preferable to provide a separator 4a arranged on the positive electrode 2 side and a separator 4b arranged on the negative electrode 3 side as a separator 4, and then to provide a lithium foil 7 as a scavenger (scavenger material) between these separators 4a and 4b. Therefore, even if some negative electrode activity inhibitors are formed due to the generation of the irreversible capacity in the positive electrode 2, the lithium foil 7 thus provided can scavenge them.

A known lithium foil can be used as the lithium foil 7 and is formed in the shape of, for example, a circle or a square.

The surface area of the lithium foil 7 is generally the same as or larger than that of the positive electrode 2 and that of the negative electrode 3. The lithium foil 7 having such surface area can efficiently scavenge negative electrode activity inhibitors (e.g., HF).

Further, the lithium foil 7 has a thickness of, for example, 0.01 to 0.1 mm, or preferably 0.01 to 0.05 mm.

The lithium foil 7 has a plurality of pores formed in the thickness direction. These pores thus formed allow the electrolyte solution 5 to pass through between the separators 4a and 4b, enabling charge/discharge.

The lithium foil 7 may be of any lithium metal, and, for example, lithium powders or paste-like lithium can also be provided as a scavenger.

The negative electrode activity inhibitor can also be scavenged by containing a compound (e.g., perhydropolysilazane, methylpolysilazane, etc.) having Si—N bond, in addition to the lithium metal mentioned above, in the cell bath 6. In this case, the negative electrode activity inhibitor is stabilized by being scavenged by the compound having Si—N bond.

Further, instead of the lithium metal, carbonate such as $Li_2CO_3$ (lithium carbonate), $Na_2CO_3$ (sodium carbonate), and $K_2CO_3$ (potassium carbonate) is preferably used as a scavenger. These may be used alone or in combination of two or more kinds.

The carbonate may be arranged, for example, between the separators 4a and 4b, or may also serve as the separator 4.

Further, a coat of carbonate may be applied to the surface of the positive electrode 2 and/or the negative electrode 3.

When the carbonate is arranged between the separators 4a and 4b, for example, powdery carbonate is added to a surface of either one of the separators 4a or 4b, and the added carbonate is sandwiched between this surface and a surface of the other separator 4a (4b).

When the carbonate also serves as the separator 4, for example, a mixture including carbonate and a binder is formed into a plate shape like the separator 4.

Examples of the binder include the above-mentioned binders. The weight ratio of carbonate to the binder varies depending on the carbonate used, and for example, preferably the weight ratio of $Li_2CO_3$/PVdF (polyvinylidene fluoride) is 5 to 9/1 to 5, or preferably the weight ratio of $Li_2CO_3$/PTFE (polytetrafluoroethylene) is 5 to 9/1 to 5.

When the surface(s) of the positive electrode 2 and/or the negative electrode 3 is/are coated with the carbonate, for example, a mixture including carbonate and a binder is mixed with stirring in a solvent, applied onto the positive electrode 2 and/or the negative electrode 3, and then dried.

Examples of the binder include, for example, the above-mentioned binders. Of these, rubber-based binders (e.g., styrene-butadiene rubber) are preferable.

Examples of the solvent include, for example, the above-mentioned solvents. Of these, NMP (N-methylpyrrolidone) and water are preferable.

The above-mentioned scavenger and the scavenger material are preferably contained in an amount of $2\times10^{-5}$ mol to $175\times10^{-5}$ mol per 1 mAh of the irreversible capacity exhibited in the positive electrode 2. When the amount of the scavenger is within this range, further excellent energy density can be exhibited.

For example, referring to the above formulae (1) to (3), 1 mol of HF is formed with a flow of 1 mol of electron. Specifically, when the irreversible capacity exhibited in the positive electrode 2 is represented by Q (mAh), and the Faraday constant is 96500 (C/mol), $M_{HF}$, or the amount of HF generated in the hybrid capacitor 1 is $M_{HF}=3.6\times Q\times F^{-1}$ (mol).

When $Li_2CO_3$ is used as a scavenger, HF is scavenged by $Li_2CO_3$ (reacts with $Li_2CO_3$) to form LiF and $H_2CO_3$, as shown in the following formula (4):

$$Li_2CO_3+2HF->2LiF+H_2CO_3 \quad (4)$$

As shown in the above formula (4), 0.5 mol of $Li_2CO_3$ is required to scavenge 1 mol of HF. More specifically, $M_{Li2CO3}$, or the amount of $Li_2CO_3$ required is $M_{Li2CO3}=0.5 M_{HF}=1.8\times Q\times F^{-1}$ (mol), and when F is substituted for 96500, $M_{Li2CO3}=2\times10^{-5}\times Q$ (mol). That is, HF can be sufficiently scavenged by containing $Li_2CO_3$ in an amount of $2\times10^{-5}\times Q$ mol or more per the irreversible capacity Q (mAh). As a result, a lowering of energy density due to the negative electrode activity inhibitor (HF) can be suppressed, so that further excellent energy density can be exhibited.

In particular, when the potential of the positive electrode 2 is not less than 4.23 V vs. Li/Li$^+$, the lithium foil 7 is preferably provided among the scavengers exemplified above.

The potential of the positive electrode 2 is set to not less than 4.23 V vs. Li/Li$^+$, for example, by applying a cell voltage of 3 V or more when hard carbon is used in the negative electrode 3.

In this case, for example, the negative electrode activity inhibitors (e.g., HF) formed according to the above formulae (1) to (3) are scavenged by the lithium foil 7. This does not form LiF in the negative electrode 3. In other words, the formation of LiF which hinders charge/discharge can be suppressed in the negative electrode 3, so that the deterioration of the capacitance and the charging/discharging cycle characteristics of the negative electrode 3 can be suppressed.

Figure 6:
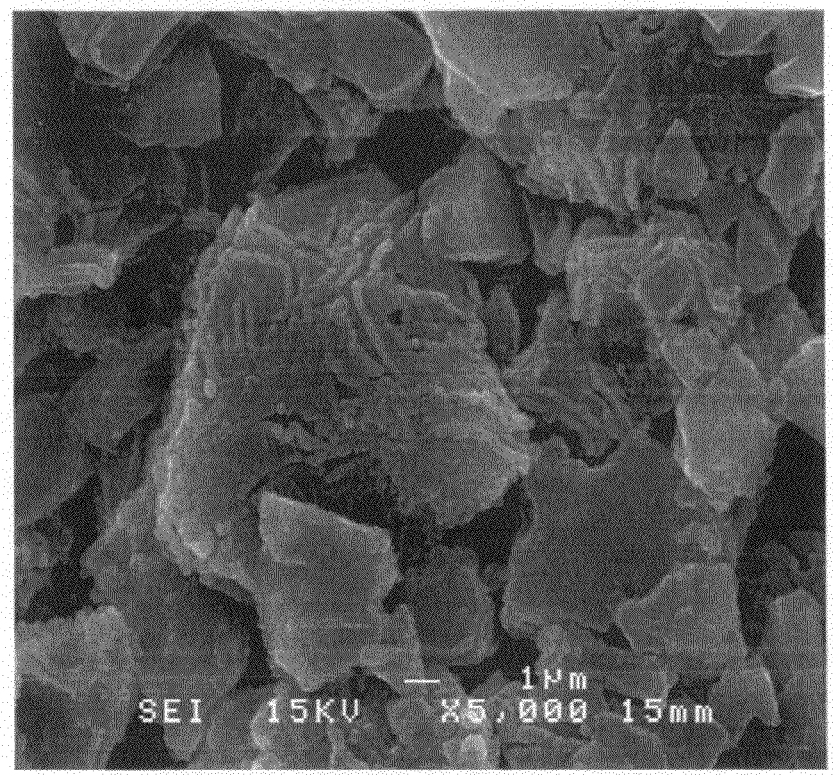
FIG. 6 is an image observed by SEM, showing a state of a surface of the negative electrode after a high voltage is applied to a hybrid capacitor without a lithium foil provided between the separators, to be charged/discharged.

Specifically, in the conventional hybrid capacitor, for example, as FIG. 6 shows a photo taken under a scanning electron microscope (SEM), showing a state of a surface of the negative electrode 3 after a high voltage (e.g., cell voltage: 4 V or more; positive electrode potential: not less than 4.23 V vs. Li/Li$^+$) is applied to be charged/discharged, a foreign matter is deposited on the surface of the negative electrode 3 (when the surface of the negative electrode in FIG. 6 was subjected to structure analysis by X-ray photoelectron spectroscopy (XPS) and Fourier transform infrared spectroscopy (FT-IR), this foreign matter was found to be LiF).

Figure 7:
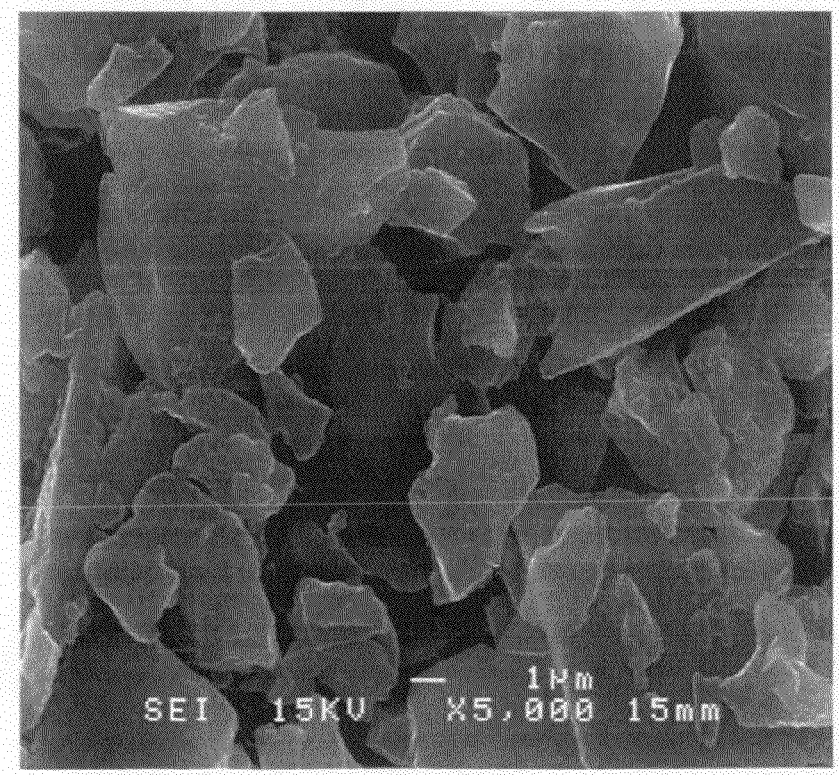
FIG. 7 is an image observed by SEM, showing a state of a surface of the negative electrode after a high voltage is applied to a hybrid capacitor with a lithium foil provided between the separators, to be charged/discharged.

On the other hand, in the hybrid capacitor 1 of this embodiment, since HF is scavenged by the lithium foil 7, as FIG. 7 shows a photo taken under a scanning electron microscope (SEM), showing a state of a surface of the negative electrode 3 after a high voltage (e.g., cell voltage: 4 V or more; positive electrode potential: not less than 4.23 V vs. Li/Li$^+$) is applied to be charged/discharged, charging/discharging at a high voltage can suppress the deposition of LiF on the surface of the negative electrode 3 (when the surface of the negative electrode in FIG. 7 was subjected to structure analysis by XPS and FT-IR, LiF was not detected but a normal component (e.g., lithium carbonate, lithium alkyl carbonate, etc.) of the SEI film was detected).

Figure 8:
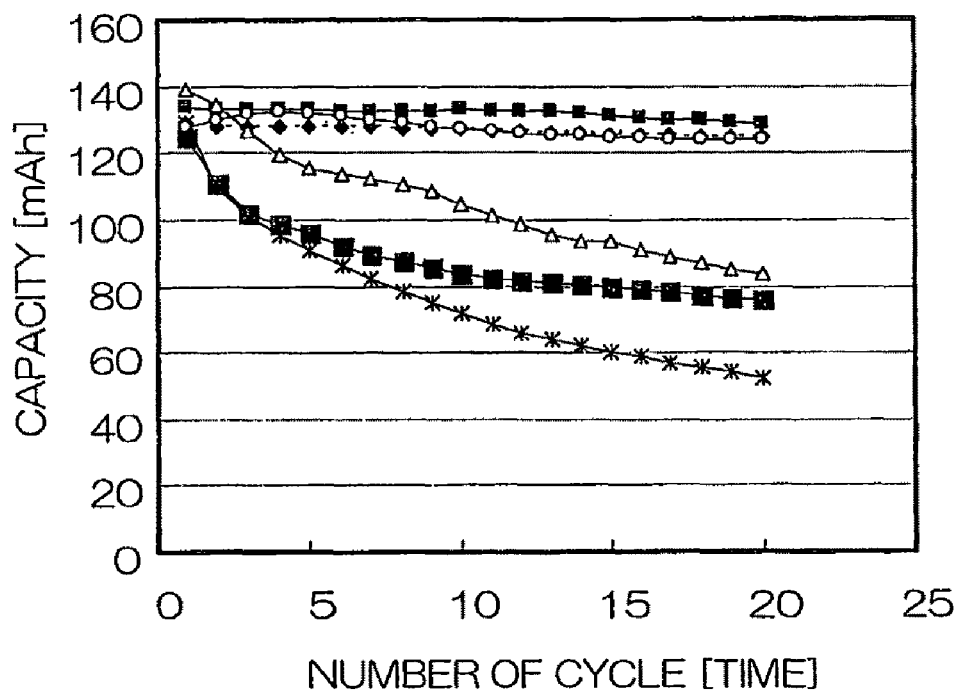
FIG. 8 is a graph showing a change in capacity of the negative electrode during a charging/discharging cycle.

As a result, as FIG. 8 shows a change in capacitance of the negative electrode during a charging/discharging cycle, with the hybrid capacitor of which the potential of the positive electrode 2 is not less than 4.23 V vs. Li/Li$^+$ (in FIG. 8, 4.23 V vs. Li/Li$^+$, 4.42 V vs. Li/Li$^+$, and 4.68 V vs. Li/Li$^+$), the capacitance and the charging/discharging cycle characteristics of the negative electrode are deteriorated.

On the other hand, with the hybrid capacitor 1 according to this embodiment, which is provided with the lithium foil 7 even if the potential of the positive electrode 2 is not less than 4.23 V vs. Li/Li$^+$, (in FIG. 8, the hybrid capacitor provided with the lithium foil 7, of which the potential of the positive electrode 2 is 4.90 V vs. Li/Li$^+$), the deposition of LiF which hinders charge/discharge can be suppressed in the negative electrode 3, so that the deterioration of the capacitance and the charging/discharging cycle characteristics of the negative electrode 3 can be suppressed.

In view of the above, in the conventional hybrid capacitor, when a cell voltage of 4 V or more is applied (positive electrode potential: not less than 4.23 V vs. Li/Li$^+$), the formation of LiF is accelerated (cf. FIG. 8), so that the capacity of the negative electrode drastically decreases. Therefore, the hybrid capacitor 1 according to this embodiment is practical when a high voltage of 4 V or more is applied (positive electrode potential: 4.23 V vs. Li/Li$^+$). That is, a higher cell voltage become available, so that the hybrid capacitor 1 having excellent energy density can be obtained.

The following are samples used in FIG. 8.

Positive electrode 2: Activated carbon (RP-15 manufactured by Kuraray Chemical, Co., Ltd.; binder: PTFE)

Negative electrode 3: Hard carbon (CARBOTRON PS(F) manufactured by Kureha Corporation; binder: PVdF)

Electrolyte solution 5: 1 mol/L of LiPF$_6$/ethylene carbonate+diethylene carbonate

EXAMPLES

While in the following, the present invention will be described in further detail with reference to Examples and Comparative Examples, the present invention is not limited to any of them.

Example 1

(Positive Electrode) A mesophase pitch (AR resin manufactured by Mitsubishi Gas Chemical Company, Inc.) was calcined at 750° C. under a nitrogen atmosphere, and graphitizable carbon (soft carbon) obtained thereby. Potassium hydroxide (KOH) was mixed with the soft carbon thus obtained at a mixing weight ratio (soft carbon/KOH) of 1:4, calcined (activated with KOH) at 800° C. under a nitrogen atmosphere, and thereafter washed with pure water to thereby obtain KOH-activated soft carbon.

Subsequently, the KOH-activated soft carbon, carbon black, and PTFE (polytetrafluoroethylene) were mixed at a mixing weight ratio (KOH-activated soft carbon/carbon black/PTFE) of 85:5:10, and rolled under pressure using a roll press machine to thereby obtain an electrode sheet having a thickness of 75 μm. The electrode sheet was then punched out in the size of φ10, and further vacuum dried at 100° C. for 12 hours to thereby produce a positive electrode.

(Negative Electrode) A hard carbon (CARBOTRON PS(F) manufactured by Kureha Corporation) and PVdF (polyvinylidene fluoride) were mixed at a mixing weight ratio (hard carbon/PVdF) of 9:1 and thoroughly stirred in NMP (1-methyl-2-pyrrolidone). Thereafter, a coating of the mixture was applied to an aluminum foil so as to have a coating thickness of about 50 μm, and then dried. The dried product was punched out in the size of φ10, and further vacuum dried at 100° C. for 12 hours to thereby produce a negative electrode.

(Separator) A 400 μm-thick ceramic filter (GB-100R manufactured by ADVANTEC) was punched out in the size of φ24 to thereby produce a separator.

(Electrolyte Solution) A solvent of ethylene carbonate/diethylene carbonate (volume ratio 1:1) with $LiPF_6$ was prepared, and an electrolyte solution having a $LiPF_6$ concentration of 1 mol/L produced thereby.

Figure 9:
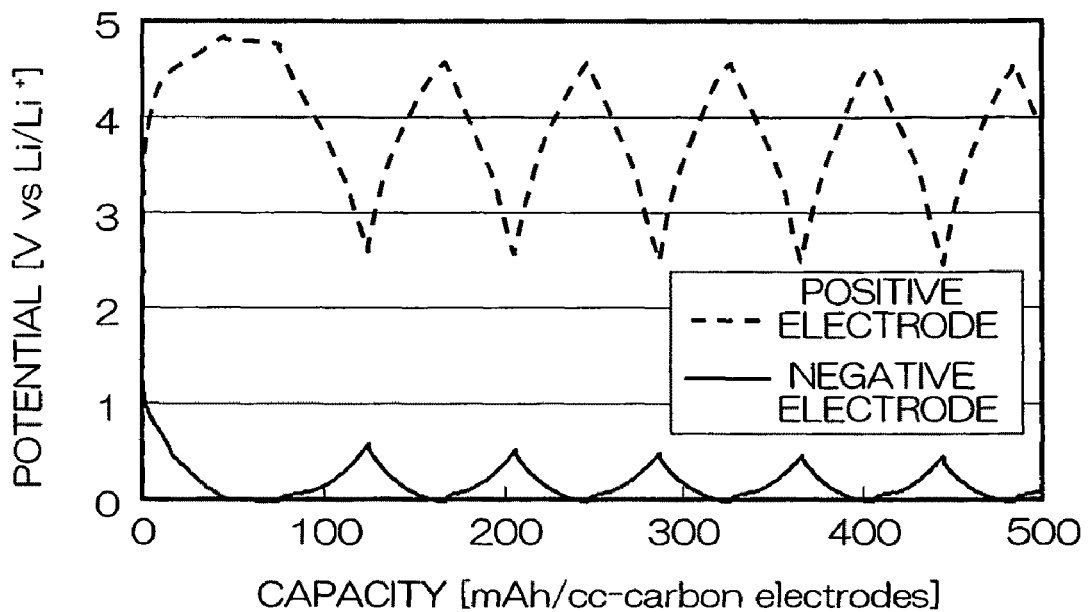
FIG. 9 is a charge/discharge profile in Example 1.

Using a sheet of the positive electrode, a sheet of the negative electrode, a sheet of the separator, and 1 cc of the electrolyte solution, a test cell was assembled and a charging/discharging test was carried out under the following charge/discharge conditions. FIG. 9 shows a charge/discharge profile. The potential of a single electrode was measured with respect to a Li reference electrode. The unit represented as "mAh/cc-carbon electrodes" along the abscissa of FIG. 9 represents a capacity (mAh) per unit volume (1 cc) of the total of the positive electrode and the negative electrode (the total volume of the positive electrode material and the negative electrode material excluding the volume of the current collector (e.g., an Al foil and a Cu foil) that carries the positive electrode material and the negative electrode material).

(Charge/Discharge Conditions)
First Cycle

After constant current charge was performed at a constant current of 1 $mA/cm^2$ until the cell voltage reached 4.8 V, the cell voltage was kept at a constant voltage of 4.8 V until the current value dropped to 0.2 $mA/cm^2$. Subsequently, constant current discharge was performed at a constant current of 1 $mA/cm^2$ until the cell voltage reached 2 V.

Second and Subsequent Cycles charging/discharging were performed in a voltage range from 2.0 to 4.6 V.

Comparative Example 1

(Positive Electrode) An activated carbon (RP-15 manufactured by Kuraray Chemical, Co., Ltd.), carbon black, and PTFE (polytetrafluoroethylene) were mixed at a mixing weight ratio (activated carbon/carbon black/PTFE) of 85:5:10, and rolled under pressure using a roll press machine to thereby obtain an electrode sheet having a thickness of 520 μm. The electrode sheet was then punched out in the size of φ10, and further vacuum dried at 100° C. for 12 hours to thereby produce a positive electrode.

(Negative Electrode) A hard carbon (CARBOTRON PS(F) manufactured by Kureha Corporation) and PVdF (polyvinylidene fluoride) were mixed at a mixing weight ratio (hard carbon/PVdF) of 9:1 and thoroughly stirred in NMP (1-methyl-2-pyrrolidone). Thereafter, a coating of the mixture was applied to an aluminum foil so as to have a coating thickness of about 50 μm, and then dried. The dried product was punched out in the size of φ10, and further vacuum dried at 100° C. for 12 hours to thereby produce a negative electrode.

(Separator) A 400 μm-thick ceramic filter (GB-100R manufactured by ADVANTEC) was punched out in the size of φ24 to thereby produce a separator.

(Electrolyte Solution) A solvent of ethylene carbonate/diethylene carbonate (volume ratio 1:1) with $LiPF_6$ was prepared and an electrolyte solution having a $LiPF_6$ concentration of 1 mol/L produced thereby.

Figure 10:
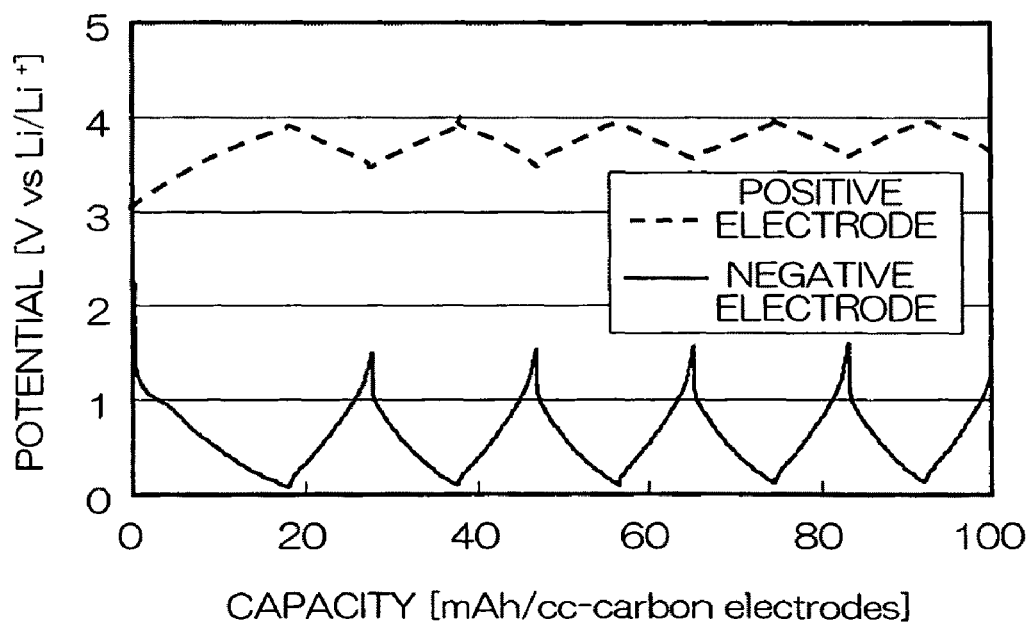
FIG. 10 is a charge/discharge profile in Comparative Example 1.

Using a sheet of the positive electrode, a sheet of the negative electrode, a sheet of the separator, and 1 cc of the electrolyte solution, a test cell was assembled, and a charging/discharging test of repeating a cycle in which constant current charge was performed at 1 $mA/cm^2$ until a cell voltage reached 3.8 V and thereafter constant current discharge was performed at 1 $mA/cm^2$ until the cell voltage dropped to 1.9 V was carried out. FIG. 10 shows a charge/discharge profile. The potential of a single electrode was measured with respect to a Li reference electrode. The unit represented as "mAh/cc-carbon electrodes" along the abscissa of FIG. 10 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material).

Discussion

In Comparative Example 1, as shown in FIG. 10, due to the irreversible capacity generated in the negative electrode, the potential range of the positive electrode narrows from about 1 V vs. $Li/Li^+$ (the positive electrode potential ranges from 3 to 4 V vs. $Li/Li^+$) to about 0.5 V vs. $Li/Li^+$ (the positive electrode potential ranges from 3.5 to 4 V vs. $Li/Li^+$).

In contrast to this, in Example 1, as shown in FIG. 9, an irreversible capacity is exhibited at the first charging/discharging cycle, and the positive electrode potential is shifted to the lower potential region, so that the potential range of the positive electrode is about 2 V vs. $Li/Li^+$ (the positive electrode potential ranges from 2.5 to 4.5 V vs. $Li/Li^+$).

Specifically, the hybrid capacitor of Example 1 can utilize the potential range of the positive electrode from 2.5 to 3.5 V vs. $Li/Li^+$ and from 4 to 4.5 V vs. $Li/Li^+$, which the hybrid capacitor of Comparative Example 1 cannot utilize, so that the amount of the positive electrode used can be reduced, thereby improving the energy density of the entire cell.

Example 2

(Positive Electrode)

A mesophase pitch (AR resin manufactured by Mitsubishi Gas Chemical Company, Inc.) was heated at 350° C. for 2 hours in the atmosphere, and then precalcined at 800° C. for 2 hours under a nitrogen atmosphere to obtain a soft carbon.

The obtained soft carbon was put into an alumina crucible, and 4 parts by weight of KOH was added to 1 part by weight of the soft carbon. The soft carbon was then calcined together with KOH (activated with KOH) at 800° C. for 2 hours under a nitrogen atmosphere. Subsequently, the soft carbon thus activated with KOH was washed with ultrapure water. The washing was performed until waste fluid from washing is neutral. Thus, a KOH-activated soft carbon (positive electrode material) was obtained. After the washing, the KOH-activated soft carbon was pulverized in a mortar and classified through a sieve (32 μm). The powders that did not pass through the sieve were pulverized again in the mortar and the classification was then repeated.

Next, the KOH-activated soft carbon thus obtained, a conductive aid (KETJENBLACK ECP manufactured by Lion Corporation), and a binder (PTFE dispersion manufactured by Daikin Industries, Ltd.) were kneaded in a mortar at a mixing weight ratio (KOH-activated soft carbon/conductive aid/binder) of 85:5:10 as a solid content, and rolled under pressure using a roll press machine to thereby obtain an electrode sheet having a thickness of 100 μm. The electrode sheet was then punched out in the size of φ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a positive electrode.

(Negative Electrode)

An artificial graphite, a soft carbon, and a binder (PVdF manufactured by Kureha Corporation) were charged into NMP (N-methylpyrrolidone) at a mixing weight ratio (artificial graphite/soft carbon/binder) of 22.5:67.5:10 as a solid content, and stirred at room temperature (25° C. to 30° C.) for 12 hours. A coating of the slurry (negative electrode material) obtained by stirring was applied to a copper foil, and then dried at 80° C. for 12 hours. The copper foil after drying was rolled under pressure using a hand press machine to thereby obtain an electrode sheet having a thickness of 29 μm. The electrode sheet was then punched out in the size of φ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a negative electrode.

(Separator) A 400 μm-thick ceramic filter (GB-100R manufactured by ADVANTEC) was punched out in the size of φ13 to thereby produce a separator.

(Electrolyte Solution) A solvent of 1 mol/L of $LiPF_6$/ethylene carbonate+diethylene carbonate (volume ratio 1:1) was prepared, and an electrolyte solution produced thereby.

(Scavenger)

$Li_2CO_3$ powder and PTFE were mixed at a mixing weight ratio ($Li_2CO_3$ powder/PTFE) of 80:20, and rolled under pressure using a roll press machine to thereby obtain a sheet having a thickness of 30 μm. This sheet was then punched out in the size of φ13, further carried into a dryer, and vacuum dried at 120° C. for 12 hours. After the inside of the dryer was purged with nitrogen, the sheet was carried into a dry Ar atmosphere glove box without being exposed to air to thereby produce a scavenger sheet.

Using a sheet of the positive electrode, a sheet of the negative electrode, two sheets of the separator, 1.5 cc of the electrolyte solution, and a sheet of the scavenger sheet, a test cell was assembled. The scavenger sheet was sandwiched with the separators. Then, a charging/discharging test was carried out with the assembled test cell under the following charge/discharge conditions.

(Charge/Discharge Conditions)

First Cycle

After constant current charge was performed at a constant current of 1 mA/cm² until the cell voltage reached 4.8 V, the cell voltage was kept at a constant voltage of 4.8 V until the current value dropped to 0.5 mA/cm². Subsequently, constant current discharge was performed at a constant current of 1 mA/cm² until the cell voltage reached 2.3 V.

Second and Subsequent Cycles

Charging/discharging were performed in a voltage range from 2.3 to 4.6 V.

Figure 11:
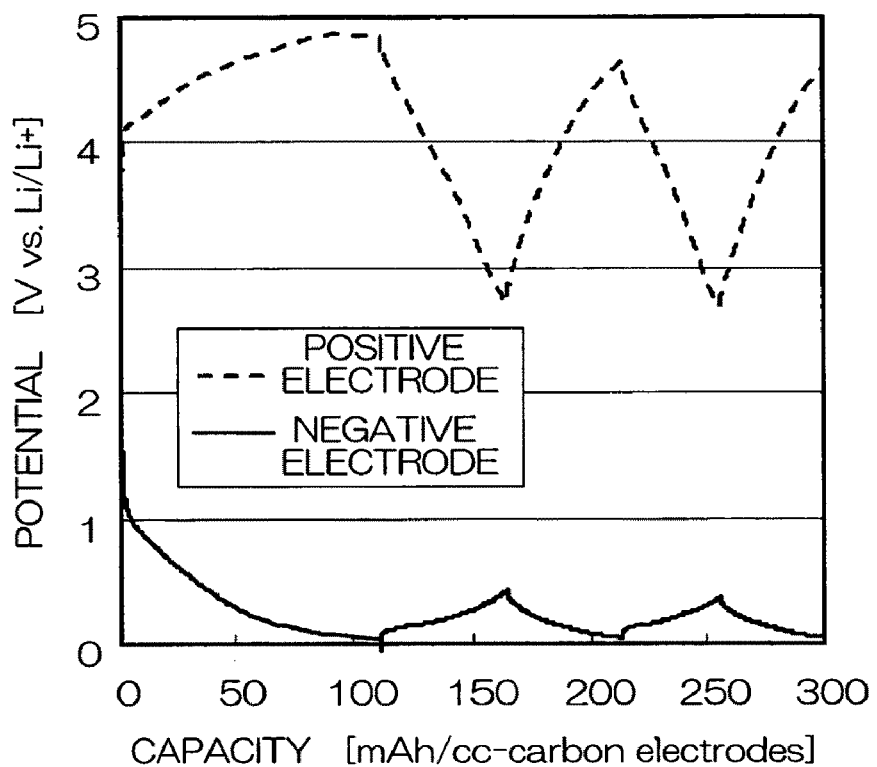
FIG. 11 is a charge/discharge profile in Example 2.

FIG. 11 shows a charge/discharge profile obtained by charging and discharging under the above charge/discharge conditions. The potential of a single electrode was measured with respect to a Li reference electrode. The unit represented as "mAh/cc-carbon electrodes" along the abscissa of FIG. 11 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material). The irreversible capacity exhibited in the positive electrode during this test was 67.2 mAh/cc-carbon electrodes.

Comparative Example 2

(Positive Electrode) An activated carbon (RP-15 manufactured by Kuraray Chemical, Co., Ltd.) of a positive electrode material, a conductive agent (KETJENBLACK ECP manufactured by Lion Corporation), and a binder (PTFE dispersion manufactured by Daikin Industries, Ltd.) were kneaded in a mortar at a mixing weight ratio (activated carbon/conductive agent/binder) of 85:5:10 as a solid content, and rolled under pressure using a roll press machine to thereby obtain an electrode sheet having a thickness of 270 μm. The electrode sheet was then punched out in the size of φ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a positive electrode.

(Negative Electrode) A non-graphitizable carbon (manufactured by Kureha Corporation) and a binder (PVdF manufactured by Kureha Corporation) were charged into NMP (N-methylpyrrolidone) at a mixing weight ratio (non-graphitizable carbon/binder) of 90:10 as a solid content, and stirred at room temperature (25° C. to 30° C.) for 12 hours. A coating of the slurry (negative electrode material) obtained by stirring was applied to a copper foil, and then dried at 80° C. for 12 hours. The copper foil after drying was rolled under pressure using a hand press machine to thereby obtain an electrode sheet having a thickness of 25 μm. The electrode sheet was then punched out in the size of φ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a negative electrode.

(Separator) A 400-μm-thick ceramic filter (GB-100R manufactured by ADVANTEC) was punched out in the size of φ24, and a separator produced thereby.

(Electrolyte Solution) A solvent of 1 mol/L of $LiPF_6$/ethylene carbonate+diethylene carbonate (volume ratio 1:1) was prepared, and an electrolyte solution produced thereby.

Using a sheet of the positive electrode, a sheet of the negative electrode, two sheets of the separator, and 1.5 cc of the electrolyte solution, a test cell was assembled. Then, a charging/discharging test was carried out with the assembled test cell under the following charge/discharge conditions.
(Charge/Discharge Conditions)

The cell voltage was charged and discharged in a voltage range from 1.9 to 3.8 V at a current of 1 mA/cm$^2$.

Figure 12:
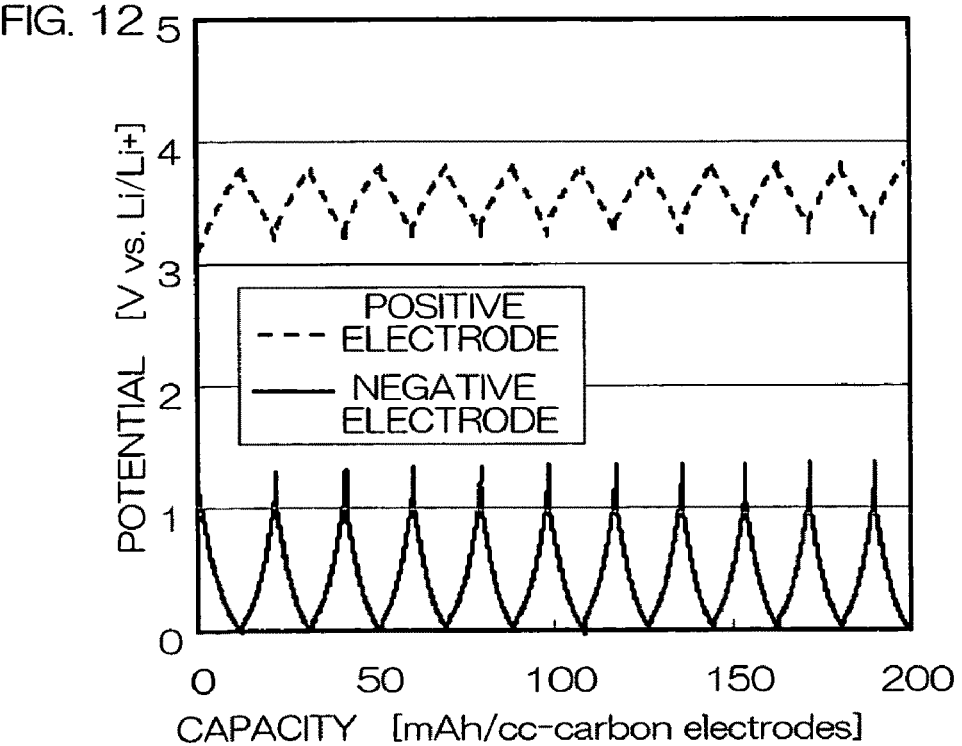
FIG. 12 is a charge/discharge profile in Comparative Example 2.
Figure 13:
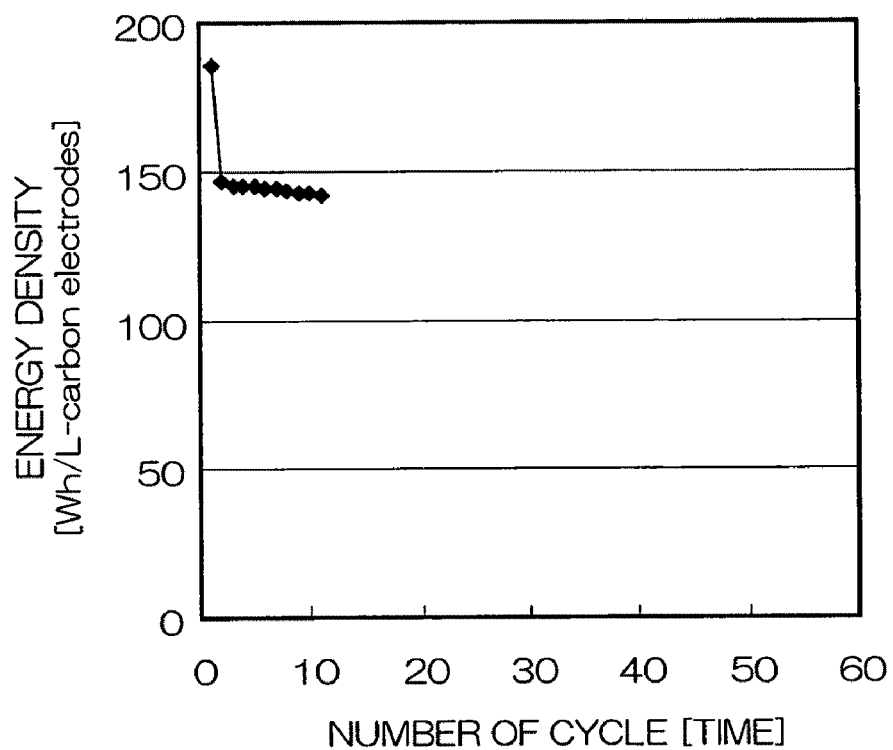
FIG. 13 is a graph showing the energy density during the charging/discharging cycle of Example 2.
Figure 14:
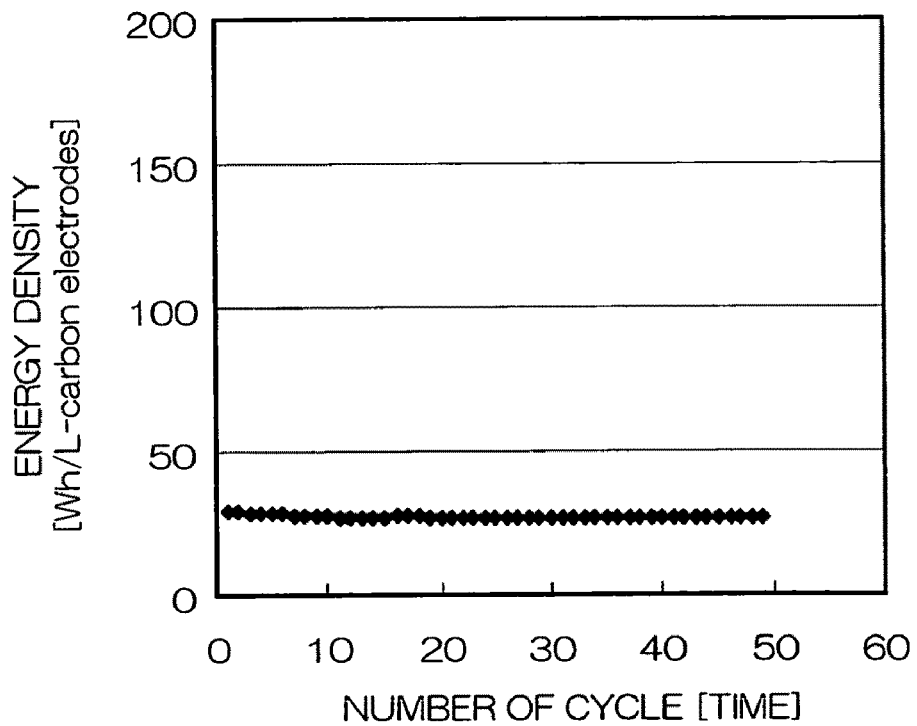
FIG. 14 is a graph showing the energy density during the charging/discharging cycle of Comparative Example 2.

FIG. 12 shows a charge/discharge profile obtained by charging and discharging under the above charge/discharge conditions. The potential of a single electrode was measured with respect to a Li reference electrode. The unit represented as "mAh/cc-carbon electrodes" along the abscissa of FIG. 12 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material).
Measurement Result FIG. 13 is a graph showing the energy density during the charging/discharging cycle of Example 2. FIG. 14 is a graph showing the energy density during the charging/discharging cycle of Comparative Example 2. The unit represented as "Wh/L-carbon electrodes" along the ordinates of FIGS. 13 and 14 represents an energy (Wh) per unit volume (1 L) of the total of the positive electrode and the negative electrode (the total (electrode layer) of the positive electrode material and the negative electrode material excluding the volume of the current collector (e.g., an Al foil and a Cu foil) that carries the positive electrode material and the negative electrode material).

As shown in FIG. 13, the test cell of Example 2 had an energy density of 145.0 Wh/L-carbon electrodes, for example, at the fifth cycle at which the charging/discharging operation became relatively stable. In contrast to this, as shown in FIG. 14, the test cell of Comparative Example 2 had an energy density of 28.2 Wh/L-carbon electrodes, for example, at the fifth cycle at which the charging/discharging operation became relatively stable.

The results confirmed that the test cell of Example 2 exhibited more excellent energy density than that of Comparative Example 2.

Trial Calculation Examples 1 and 2

Figure 15:
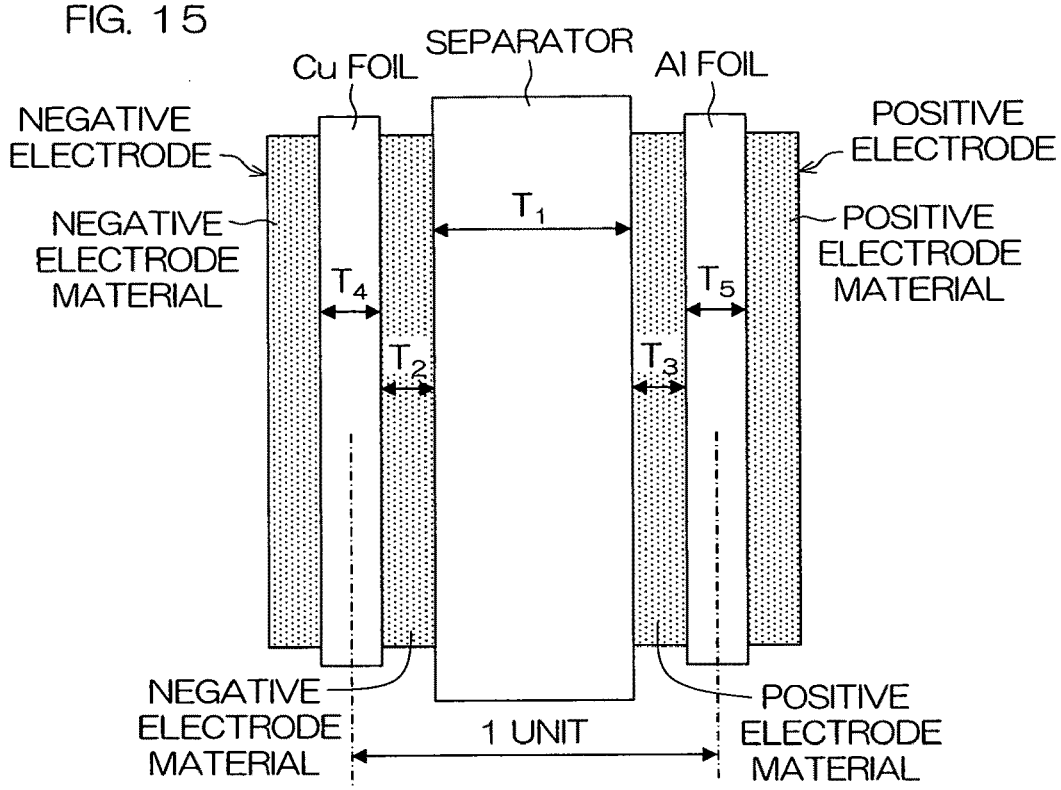
FIG. 15 is a schematic configuration diagram showing a cell structure of a hybrid capacitor used to obtain the trial calculation data of Example 2 and Comparative Example 2.

Next, in order to confirm how the energy density of the hybrid capacitor changed according to the amount of the scavenger added relative to the irreversible capacity exhibited in the positive electrode, Trial Calculation Examples 1 and 2 were carried out. In Trial Calculation Examples 1 and 2, the energy density of the cell assembled as shown in FIG. 15 was calculated based on the energy density (actually measured values) in Example 2 and Comparative Example 2 under the following trial calculation conditions.
(Trial Calculation Conditions)

Trial Calculation Example 1 (Example 2)

Positive electrode: A coating of positive electrode material was applied to both surfaces of an Al foil to thereby form a positive electrode.
Negative electrode: A coating of negative electrode material was applied to both surfaces of a Cu foil to thereby form a negative electrode.
Scavenger: $Li_2CO_3$
Shape of the scavenger: $Li_2CO_3$ powder and PTFE were mixed at a mixing weight ratio ($Li_2CO_3$ powder/PTFE) of 80:20, and rolled under pressure using a roll press machine to thereby obtain a sheet. This sheet was used as a scavenger sheet. The scavenger sheet also served as a separator.
Thickness of electrode layer $T_2+T_3$: 120 μm
Energy density of electrode layer: 145 Wh/L-carbon electrodes
Thickness of separator (including scavenger) $T_1$: Varies depending on the amount of $Li_2CO_3$ added.
Thickness of Cu foil $T_4$: 15 μm
Thickness of Al foil $T_5$: 15 μm Trial Calculation Example 2 (Comparative Example 2)

Figure 16:
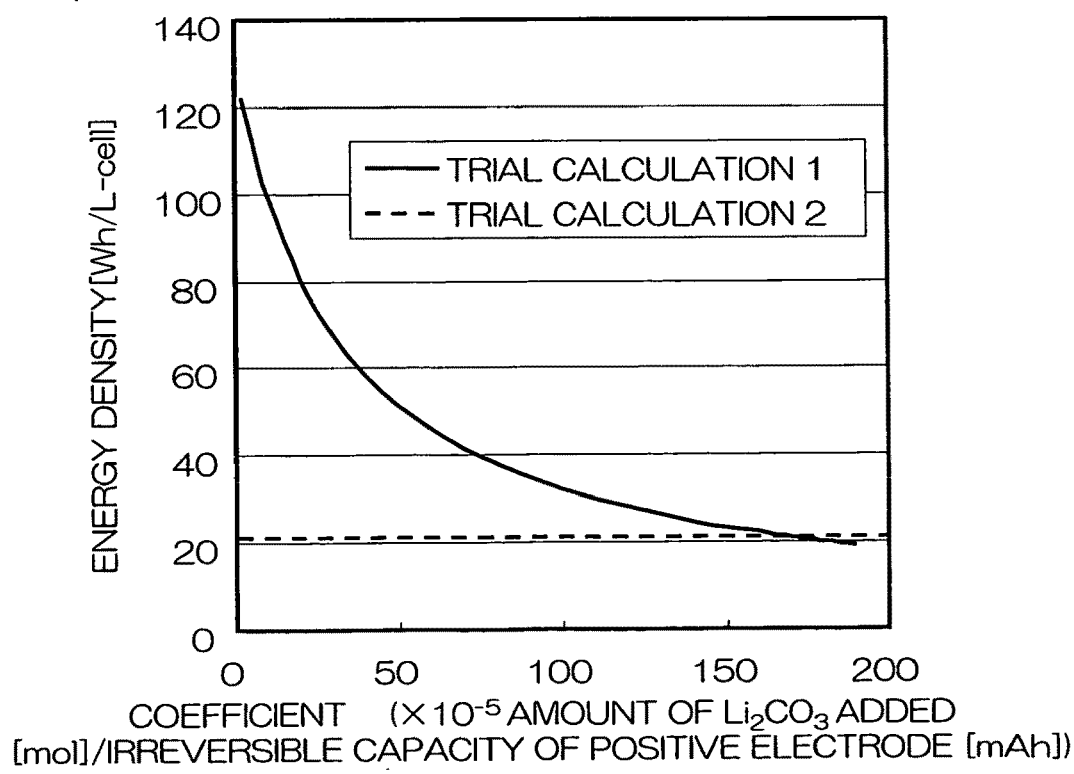
FIG. 16 is a graph showing changes in energy density when the amount of $Li_2CO_3$ added is changed relative to the irreversible capacity in Trial Calculation Examples 1 and 2.

Positive electrode: A coating of positive electrode material was applied to both surfaces of an Al foil to thereby form a positive electrode.
Negative electrode: A coating of negative electrode material was applied to both surfaces of a Cu foil to thereby form a negative electrode.
Scavenger: Not used.
Thickness of electrode layer $T_2+T_3$: 120 μm
Energy density of electrode layer: 28.2 Wh/L-carbon electrodes
Thickness of separator $T_1$: 30 μm
Thickness of Cu foil $T_4$: 15 μm
Thickness of Al foil $T_5$: 15 μm
Measurement Result FIG. 16 is a graph showing changes in energy density when the amount (coefficient) of $Li_2CO_3$ added is changed relative to the irreversible capacity in Trial Calculation Examples 1 and 2. The unit represented as "Wh/L-cell" along the ordinates of FIG. 16 represents an energy (Wh) per unit volume (1 L) of one unit cell (electrode layer (positive electrode material+negative electrode material)+separator+a separator side half of the Cu foil in the thickness direction+a separator side half of the Al foil in the thickness direction).

As shown in FIG. 16, the energy density of Trial Calculation Example 1 was, for example, 122 Wh/L-cell when the coefficient was $2 \times 10^{-5}$ mol/mAh-cell, and was 20.5 Wh/L-cell when the coefficient was $175 \times 10^{-5}$ mol/mAh-cell. In contrast to this, since the cell of Trial Calculation Example 2 did not contain any scavenger, the energy density of Trial Calculation Example 2 was constant at 20.5 Wh/L-cell regardless of the coefficient.

As a result, it was confirmed that in Trial Calculation Example 1, when the coefficient was in the range of $2 \times 10^{-5}$ mol/mAh to $175 \times 10^{-5}$ mol/mAh, that is, when the scavenger was added at a ratio of $2 \times 10^{-5}$ mol to $175 \times 10^{-5}$ mol relative to 1 mAh of the irreversible capacity, the energy density was always more than that of Trial Calculation Example 2. Specifically, it was confirmed that when the amount of the scavenger added was within the above range, it was possible to successfully scavenge negative electrode active material, thereby exhibiting further excellent energy density.

Example 3

(Positive Electrode) An activated carbon (RP-15 manufactured by Kuraray Chemical, Co., Ltd.), carbon black, and PTFE (polytetrafluoroethylene) were mixed at a mixing weight ratio (activated carbon/carbon black/PTFE) of 85:5:10, and rolled under pressure using a roll press machine to thereby obtain an electrode sheet having a thickness of 200 μm. The electrode sheet was then punched out in the size of ϕ10, and further vacuum dried at 100° C. for 12 hours to thereby produce a positive electrode.

(Negative Electrode) A hard carbon (CARBOTRON PS(F) manufactured by Kureha Corporation) and PVdF (polyvinylidene fluoride) were mixed at a mixing weight ratio (hard carbon/PVdF) of 9:1 and thoroughly stirred in NMP (1-methyl-2-pyrrolidone). Thereafter, a coating of the mixture was applied to an aluminum foil so as to have a coating thickness of about 30 μm, and then dried. The dried product was punched out in the size of ϕ10, and further vacuum dried at 100° C. for 12 hours to thereby produce a negative electrode.

(Separator) A 400 μm-thick ceramic filter (GB-100R manufactured by ADVANTEC) was punched out in the size of ϕ24 to thereby produce a separator.

(Electrolyte Solution) A solvent of 1 mol/L of $LiPF_6$/ethylene carbonate+diethylene carbonate (volume ratio 1:1) was prepared, and an electrolyte solution produced thereby.

(Lithium Foil) Pores were formed in a 30 μm-thick lithium foil (manufactured by Honjo Metal Co., Ltd.) having a size of 10 mm×10 mm, which was used as a lithium foil for test.

Figure 17:
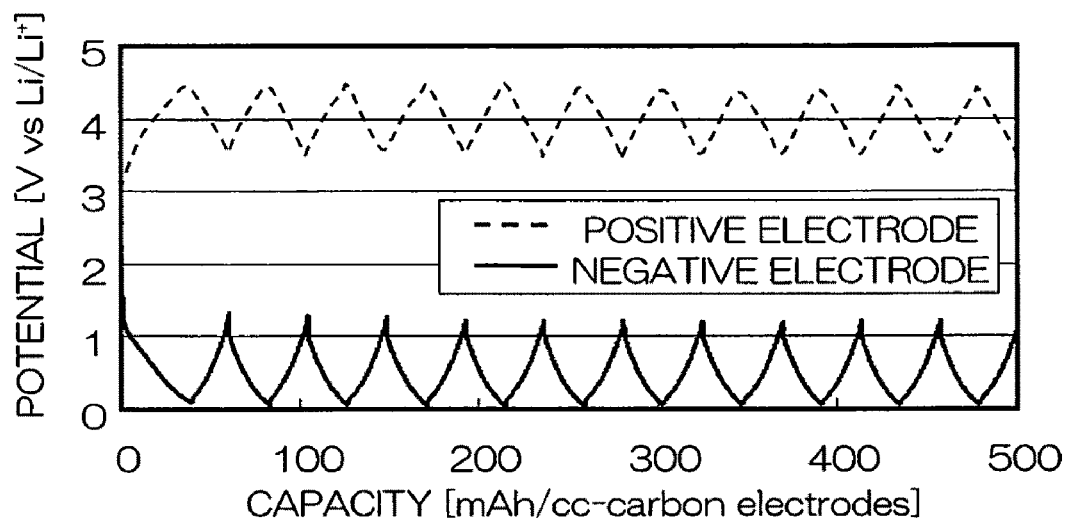
FIG. 17 is a charge/discharge profile of Example 3.

Using a sheet of the positive electrode, a sheet of the negative electrode, two sheets of the separator, 1.5 cc of the electrolyte solution, and a sheet of the lithium foil, a test cell was assembled and a charging/discharging test was carried out in the voltage range of 2.2 to 4.4 V (current density: 1 $mA/cm^2$). FIG. 17 shows a charge/discharge profile thereof. The potential of a single electrode was measured with respect to a Li reference electrode. The unit represented as "mAh/cc-carbon electrodes" along the abscissa of FIG. 17 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material).

Comparative Example 3

Figure 18:
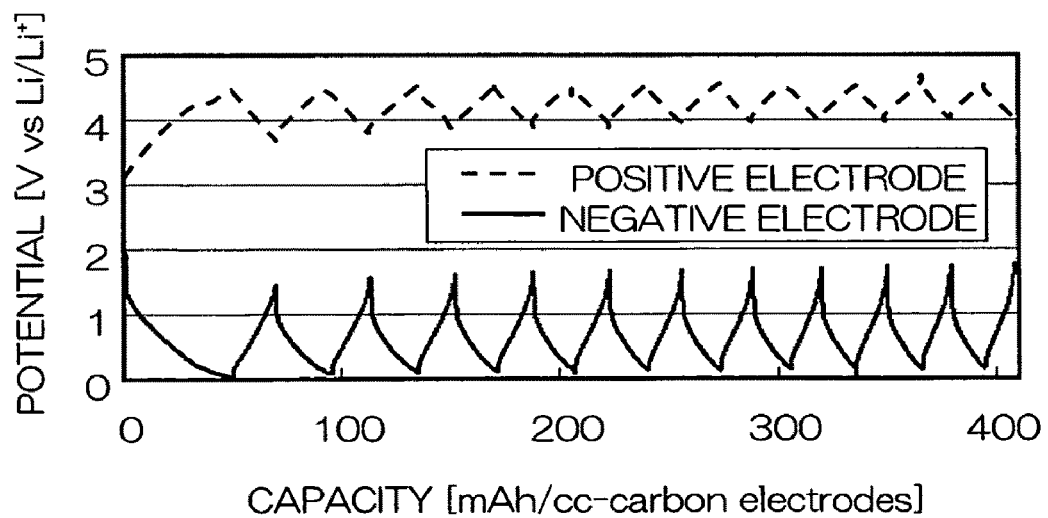
FIG. 18 is a charge/discharge profile of Comparative Example 3.

Using a sheet of the positive electrode, a sheet of the negative electrode, a sheet of the separator, and 1 cc of the electrolyte solution, which were used in Example 3 above, a test cell was assembled and a charging/discharging test was carried out in the voltage range of 2.2 to 4.4 V (current density: 1 $mA/cm^2$). FIG. 18 shows a charge/discharge profile thereof. The potential of a single electrode was measured with respect to a Li reference electrode. The unit represented as "mAh/cc-carbon electrodes" along the abscissa of FIG. 18 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material).

Discussion

Figure 19:
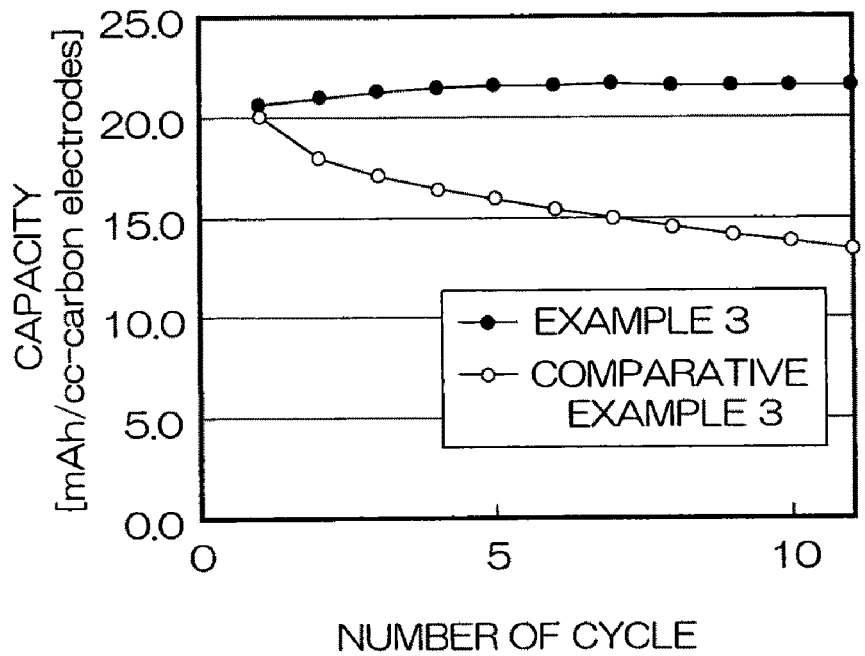
FIG. 19 is a graph showing changes in capacitance during the charging/discharging cycles of Example 3 and Comparative Example 3.
Figure 20:
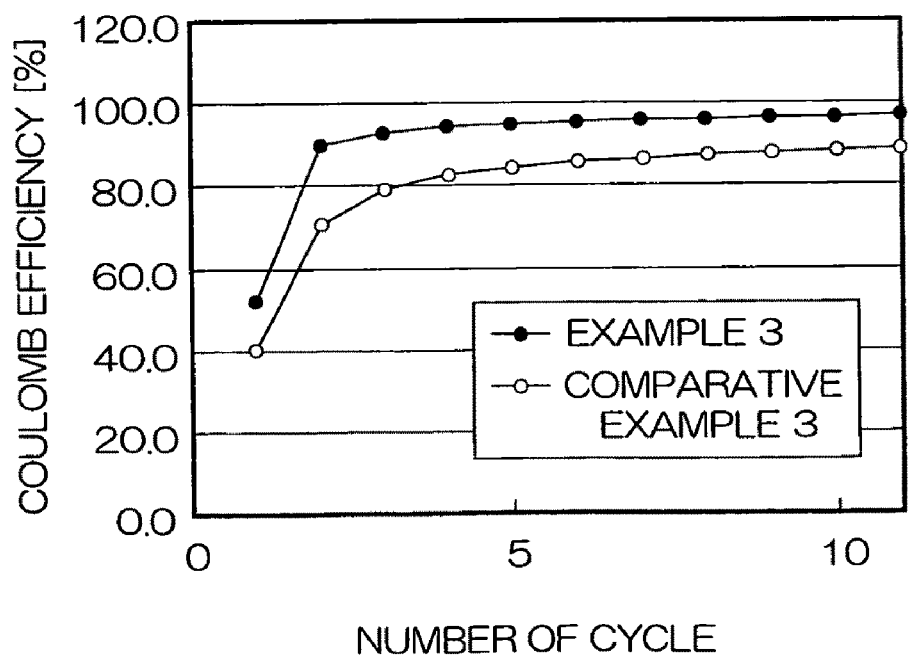
FIG. 20 is a graph showing changes in coulomb efficiency during the charging/discharging cycles of Example 3 and Comparative Example 3.

FIG. 19 shows changes in capacitance during the charging/discharging cycles of Example 3 and Comparative Example 3, and FIG. 20 shows changes in coulomb efficiency during the charging/discharging cycles of Example 3 and Comparative Example 3. The unit represented as "mAh/cc-carbon electrodes" along the ordinates of FIG. 19 represents a capacity (mAh) per unit volume (1 cc) of the total of the positive electrode and the negative electrode (the total of the positive electrode material and the negative electrode material excluding the volume of the current collector (e.g., an Al foil and a Cu foil) that carries the positive electrode material and the negative electrode material).

In Comparative Example 3, the potential of the positive electrode is not less than 4.23 V vs. $Li/Li^+$, and a lithium foil is not provided. Therefore, LiF is deposited on the surface of the negative electrode, and as shown in FIG. 19, the capacitance of the negative electrode is decreased as the charging/discharging cycle progresses. For example, the capacitance is decreased from about 21 mAh/cc-carbon electrodes (at the first cycle) to about 14 mAh/cc-carbon electrodes (at the tenth cycle). Due to the decrease in the capacitance of the negative electrode, the capacitance of the entire test cell is decreased (cf. FIG. 18). That is, the charging/discharging cycle characteristics are deteriorated. In addition, the coulomb efficiency (the ratio of discharge capacity to charge capacity) is found to be low (cf. FIG. 20), indicating that charging/discharging is not efficiently performed.

In contrast to this, in Example 3, although the potential of the positive electrode is not less than 4.23 V vs. $Li/Li^+$, since HF is scavenged by the lithium foil, average electric capacities of about 21 to 22 mAh/cc-carbon electrodes are exhibited during the charging/discharging cycle (cf. FIG. 19). Therefore, without decreasing the capacitance of the entire test cell, excellent charging/discharging cycle characteristics are demonstrated (cf. FIG. 17). Furthermore, the coulomb efficiency is found to be high (cf. FIG. 20).

As a result, as seen in Example 3, with a hybrid capacitor capable of suppressing the deposition of LiF, which is a cause of the capacity loss, in the negative electrode, a high voltage (e.g., 4 V or more) can be applied to the positive electrode. That is, the cell voltage can be increased, which can realize a hybrid capacitor having excellent energy density.

Test Examples

Test Examples 1 to 7

Next, in order to confirm how the capacitance of the negative electrode changed according to the type of the scavenger, Test Examples 1 to 7 were carried out.

(Positive Electrode) An activated carbon (RP-15 manufactured by Kuraray Chemical, Co., Ltd.), a conductive agent (KETJENBLACK ECP manufactured by Lion Corporation), and a binder (PTFE dispersion manufactured by Daikin Industries, Ltd.) were kneaded in a mortar at a mixing weight ratio (activated carbon/conductive agent/binder) of 85:5:10 as a solid content, and rolled under pressure using a roll press machine to thereby obtain an electrode sheet having a thickness of 130 μm. The electrode sheet was then punched out in the size of ϕ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a positive electrode.

(Negative Electrode) A non-graphitizable carbon (manufactured by Kureha Corporation) and a binder (PVdF manufactured by Kureha Corporation) were charged into NMP (N-methylpyrrolidone) at a mixing weight ratio (non-graphitizable carbon/binder) of 9:1 as a solid content, and stirred at room temperature (25° C. to 30° C.) for 12 hours. A coating of the slurry obtained by stirring was applied to a copper foil, and then dried at 80° C. for 12 hours. The copper foil after drying was then punched out in the size of ϕ10, further carried into a dryer, and vacuum dried at 120° C. for 12 hours. After the inside of the dryer was purged with nitrogen, the electrode sheet was carried into a dry Ar atmosphere glove box without being exposed to air to thereby produce a negative electrode.

(Separator) A 400 μm-thick ceramic filter (GB-100R manufactured by ADVANTEC) was punched out in the size of φ24 to thereby produce a separator.

(Electrolyte Solution) A solvent of 1 mol/L of $LiPF_6$/ethylene carbonate+diethylene carbonate (volume ratio 1:1) was prepared and an electrolyte solution produced thereby.

(Scavenger) In each Test Example, the scavengers shown in the following Table 1 were used in an amount sufficient to achieve scavenging of negative electrode activity inhibitors.

TABLE 1

| Test Ex. 1 | Test Ex. 2 | Test Ex. 3 | Test Ex. 4 | Test Ex. 5 | Test Ex. 6 | Test Ex. 7 |
| --- | --- | --- | --- | --- | --- | --- |
| Li (foil) | $Li_2Co_3$ (powder) | $Na_2Co_3$ (powder) | $K_2Co_3$ (powder) | Not used | $CaCo_3$ (powder) | $Cs_2Co_3$ (powder) |

Using a sheet of the positive electrode, a sheet of the negative electrode, two sheets of the separator, and 1.5 cc of the electrolyte solution, a test cell was assembled. As for the scavengers of Test Examples excluding that of Test Example 1, powdery scavenger was added to a surface of either of the separators, and the added scavenger was sandwiched between the surface thereof and a surface of the other separator. In contrast to this, as for the scavenger of Test Example 1, a foil-like scavenger (Li) was sandwiched between the two sheets of the separators. A charging/discharging test was then carried out with the assembled test cell in the voltage range of 0 to 1.5 V (vs. $Li/Li^+$) (current density: 1 $mA/cm^2$).

Discussion

Figure 21:
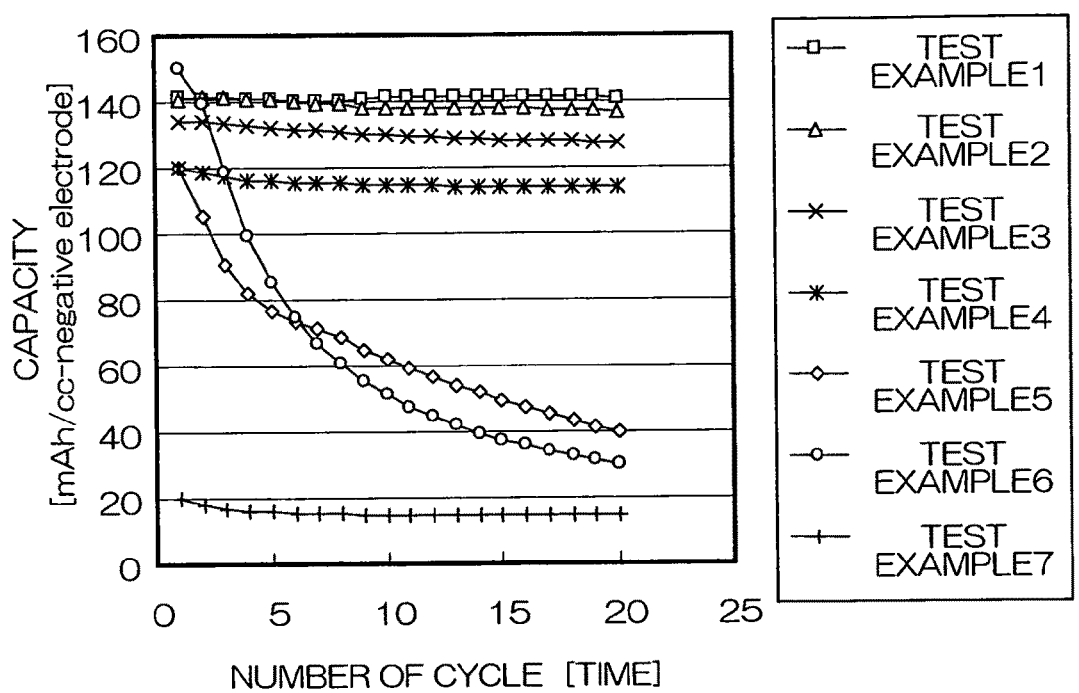
FIG. 21 is a graph showing changes in capacitance of the negative electrode during the charging/discharging cycles of Test Examples 1 to 7.

FIG. 21 shows changes in capacitance of the negative electrode during the charging/discharging cycles of Test Examples 1 to 7. The unit represented as "mAh/cc-negative electrode" along the ordinates of FIG. 21 represents a capacity (mAh) per unit volume (1 cc) of the negative electrode (the negative electrode material excluding the volume of the current collector (e.g., a Cu foil) that carries the negative electrode material).

As shown in FIG. 21, in Test Examples 1 to 4 in which Li, $Li_2CO_3$, $Na_2CO_3$, and $K_2CO_3$ have been contained as a scavenger, it was confirmed that even if the charging/discharging cycle was repeated, the average capacitance was found to be exhibited. For example, the result of Test Example 2 confirmed that a capacitance of 140.4 mAh/cc-negative electrode was exhibited at the fifth cycle at which the charging/discharging operation became relatively stable.

Specifically, the results of FIG. 21 confirmed that it was possible to exhibit more excellent energy density in Test Examples 1 to 4 than that in Test Examples 5 to 7 in which the capacitance of the negative electrode gradually decreased as the charging/discharging cycle was repeated.

While the illustrative embodiments of the present invention are provided in the above description, such is for illustrative purpose only and it is not to be construed restrictively. Modification and variation of the present invention that will be obvious to those skilled in the art is to be covered by the following claims.

This Application corresponds to Japanese Patent Application No. 2006-252874 filed on Sep. 19, 2006 and Japanese Patent Application No. 2006-252875 filed on Sep. 19, 2006 with Japanese Patent Office, the disclosures of which are incorporated herein by reference.

Industrial Applicability

As discussed in the foregoing, the electrochemical capacitor of the present invention is suitably used in various industrial products employing an electrochemical capacitor, such as electrochemical capacitors mounted in vehicles (hybrid vehicles, fuel cell vehicles, etc.), and memory backup power supplies for notebook computers, cellular phones or the like.

The invention claimed is:

1. An electrochemical capacitor comprising:
   a positive electrode which exhibits an irreversible capacity for extending a potential range in a charging/discharging cycle;
   a negative electrode composed of a material capable of reversibly carrying lithium ions;
   an electrolyte solution composed of an organic solvent containing lithium ions; and
   a scavenger which scavenges a negative electrode activity inhibitor derived from anions contained in the electrolyte solution due to generation of the irreversible capacity in the positive electrode;
   wherein the scavenger is contained at a ratio of $2 \times 10^{-5}$ mol to $175 \times 10^{-5}$ mol per 1 mAh of the irreversible capacity.

2. The electrochemical capacitor according to claim 1, wherein a potential of the positive electrode is not less than 4.23 V vs. $Li/Li^+$.

* * * * *